United States Patent [19]

Harrison et al.

[11] Patent Number: 5,379,037
[45] Date of Patent: Jan. 3, 1995

[54] APPARATUS FOR DECODING DEGRADED DATA SIGNALS

[75] Inventors: Clarence Harrison; Mark D. Marik; Roger L. Posthumus, all of Charlotte, N.C.

[73] Assignee: International Business Machines Corporation, Armonk, N.Y.

[21] Appl. No.: 128,986

[22] Filed: Sep. 29, 1993

Related U.S. Application Data

[62] Division of Ser. No. 822,595, Jan. 17, 1992, Pat. No. 5,298,897, which is a division of Ser. No. 477,320, Feb. 7, 1990, Pat. No. 5,168,275.

[51] Int. Cl.$^6$ ............................................. H03M 5/12
[52] U.S. Cl. ...................................................... 341/71
[58] Field of Search .................. 341/71, 94; 360/2, 53; 371/5.1

[56] References Cited

U.S. PATENT DOCUMENTS

| | | |
|---|---|---|
| 3,549,804 | 12/1970 | Greenspan et al. |
| 4,053,736 | 10/1977 | Banks et al. |
| 4,124,778 | 11/1978 | Amass |
| 4,141,494 | 2/1979 | Fisher |
| 4,239,151 | 12/1980 | Enser et al. |
| 4,242,755 | 12/1980 | Gauzan |
| 4,254,441 | 3/1981 | Fisher |
| 4,346,474 | 8/1982 | Sze ........................................ 371/49 |
| 4,357,707 | 11/1982 | Delury |
| 4,547,764 | 10/1985 | Levy-Navarro et al. |
| 4,551,846 | 11/1985 | Takeda et al. |
| 4,554,509 | 11/1985 | Cornett |
| 4,593,328 | 6/1986 | Baus, Jr. |
| 4,626,670 | 12/1986 | Miller |
| 4,788,420 | 11/1988 | Chang et al. |
| 4,794,467 | 12/1988 | Okuyama et al. ..................... 360/15 |
| 4,839,508 | 6/1989 | Frolov |
| 5,168,275 | 12/1992 | Harrison et al. |

OTHER PUBLICATIONS

Magnetic Stripe Card Standards, MAGTEK, 1983.
American National Standard for Financial Services—Financial Transaction Cards—Magnetic Stripe Encoding, ANSI X4.16-1983, American National Standards Institute, Inc., 1983.
Identification Cards—Financial Transaction Cards, Ref. No. ISO 7813:1987 (E), International Organization for Standardization, 1987.
Identification Cards—Recording Technique-Part 5: Location of Rear-Write Magnetic Track-Track 3, Ref. No. ISO 7811/5-1985(E), International Organization for Standardization, 1985.
Identification Cards—Recording Technique-Part 4: Location of Read-Only Magnetic Tracks-Tracks 1 and 2, Ref. No. ISO 7811/4-1985(E), International Organization for Standardization, 1985.
Information Processing-Unrecorded 12,7mm (0.5 in) Wide Magnetic Tape for Information Interchange-32 ftpmm(800ftpi)NFZ1,126 ftpmm(3 200 ftpi)Phase Encoded and 356 ftpmm (9 042 ftpi) NRZ1, Ref. No. ISO 1864-1985(E), ISO, 1985.
Identification Cards—Recording Technique-Part 2: Magnetic Stripe, Ref. No. ISO 7811/2-1985(E), International Organization for Standardization, 1985.

*Primary Examiner*—Brian K. Young
*Attorney, Agent, or Firm*—Bell, Seltzer, Park & Gibson

[57] ABSTRACT

A two-frequency data signal, also known as a biphase or F/2 F signal, is accurately decoded by sampling the signal and digitizing the samples to provide a series of digital values representing the signal. An intelligent digital filter manipulates the digital values to decode the signal, by detecting the peaks in the sampled signal and decoding the signal by analyzing the location and amplitudes of the peaks. Only peaks which are outside a guard band may be detected. If the signal cannot be properly decoded with a wide guard band, the guard band may be repeatedly narrowed, until a minimum guard band is reached.

Bits are identified by comparing the displacements between peaks to a bit cell width. An even number of displacements indicates a '0' bit, and an odd number of displacements indicates a '1' bit. After decoding, the bits are converted into bytes. Parity and longitudinal redundancy code checks are used to correct bad bits.

During decoding, many indications of a degraded signal may be obtained. If a degraded signal is indicated, the host computer is notified, even though the signal was properly read. Card replacement can then be initiated at the first signs of signal degradation, before the data signal becomes unreadable.

30 Claims, 22 Drawing Sheets

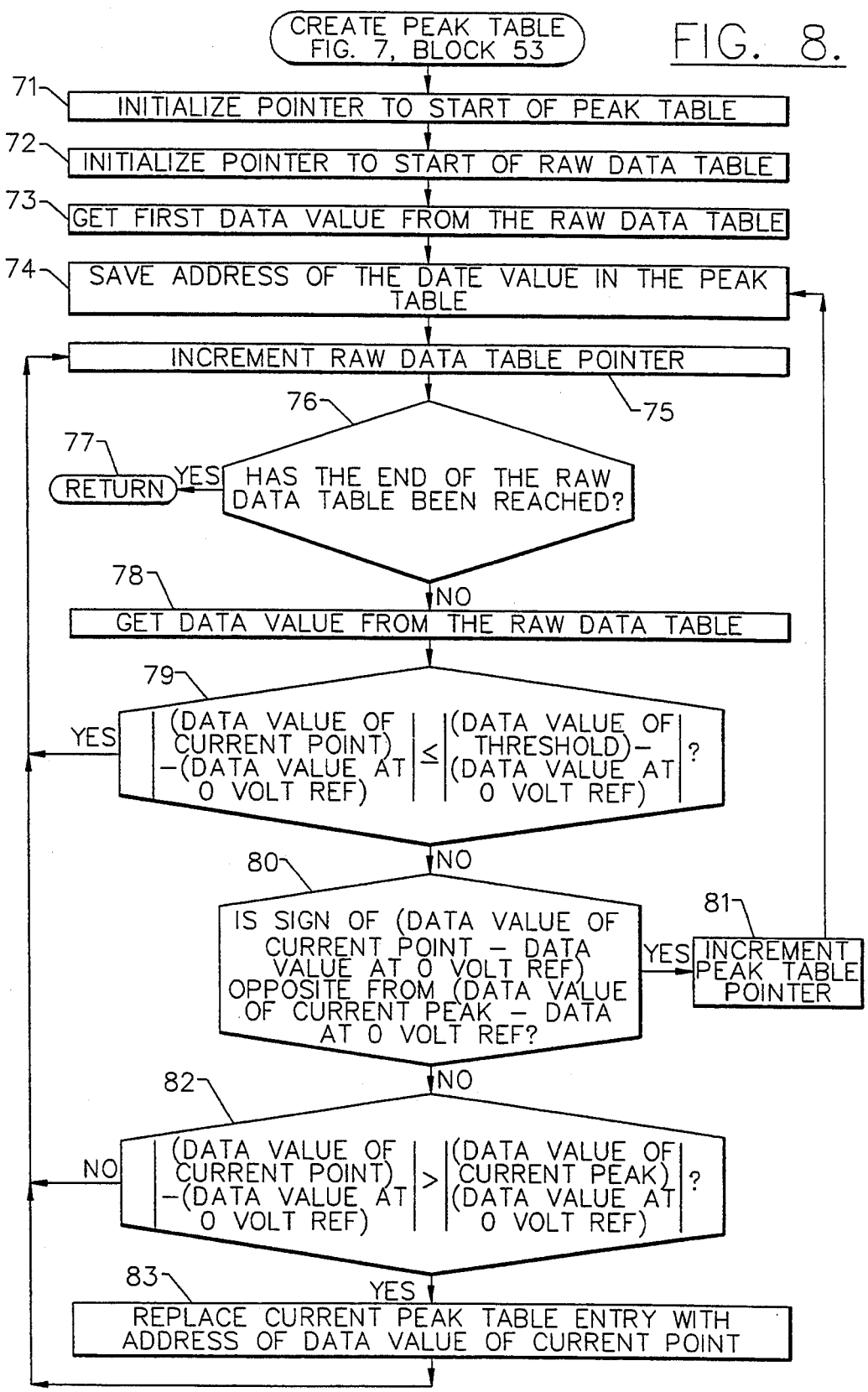

APPARATUS FOR DECODING DEGRADED DATA SIGNALS

This application is a divisional of application Ser. No. 07/822,595, filed Jan. 17, 1992, now U.S. Pat. No. 5,298,897, which is a divisional of application Ser. No. 07/477,320 filed Feb. 7, 1990, now U.S. Pat. No. 5,168,275.

FIELD OF THE INVENTION

This invention relates to a method and apparatus for decoding two-frequency data signals and more particularly to a method and apparatus for accurately and efficiently decoding degraded two-frequency data signals.

BACKGROUND OF THE INVENTION

Two-frequency data signals, often referred to as "biphase" or "F/2F" data signals, are widely used for encoding data on magnetic media such as a magnetic stripe typically found on cards, passbooks and other tokens. Magnetic stripe bearing cards or passbooks are typically employed with an automatic teller machine or point of sale terminal or other types of terminals requiring magnetic stripe reading. The magnetic stripe typically includes data concerning a user's bank, account number and other financial data.

Two-frequency data signals are typically encoded on magnetic media as a series of flux reversals. These flux reversals provide a clocking transition and a data transition. The linear distance between two clocking transitions on a stripe is called a "bit cell". When the bit cell contains no intermediate data transition or flux reversal the bit cell is assigned a binary value of '0'. When the bit cell includes one flux reversal or data transition between the clocking transitions within the cell, the cell is assigned a binary value of '1'. The data transition in a '1' bit cell is typically placed at or near the mid point of the bit cell.

FIG. 1 illustrates an example of a two-frequency data signal. It may be seen that a '0' bit may be represented by a bit cell having first and second signal peaks of opposite polarity at the beginning and end thereof respectively (i.e., one peak-to-peak displacement), and a "1" bit may be represented by a bit cell having signal peaks of same polarity at the beginning and end thereof and a signal peak of opposite polarity therebetween (i.e., two peak-to-peak displacements). Accordingly, it may be seen that if the '0' bit is assumed to be encoded at a frequency F, the '1' bit has a frequency of 2F; hence the F/2F designation for these data signals.

F/2F data signals are typically read using a magnetic read head and decoder circuitry to identify zero crossing transitions. An example of such a decoder is illustrated in U.S. Pat. No. 4,254,441 to Fisher which discloses a magnetic read head and a decoder which uses amplitude discrimination and zero slope detection to detect '0' and '1' bits. Unfortunately, zero crossing transitions tend to become obscured by noise as the signal degrades, thereby making accurate decoding difficult.

Since the clocking of F/2F signals is dependent upon a constant rate of relative movement between the magnetic stripe and the read head, much development effort has been directed to providing constant speed heads and/or card transports. See for example U.S. Pat. No. 4,593,328 to Bause, Jr. which discloses a timing wheel which frictionally engages a card as it is moved past a reader to provide timing information.

A major problem in decoding two-frequency signals is decoding a degraded signal. It is well known that magnetic media signals degrade over time. Such degradation may result in a reduction of the amplitude of the flux reversals due to magnetic flux dissipation processes. Degradation may also occur as a result of the introduction of noise signals, in the form of spurious flux reversals or perturbations, in the magnetic media due to stray magnetic fields. Moreover, the physical magnetic media itself is subject to physical abrasion which may remove whole sections of the magnetic media and create fractures in the media.

Typical F/2F data encoded on magnetic media includes a parity bit and a longitudinal record code (LRC) which may be employed to verify the integrity of the F/2F data. Cards which fail these integrity tests, and cards which are unreadable due to a degraded signal, are rejected by the automatic teller machine or point of sale terminal. The intended transaction is not completed, and the card holder is told to obtain a new card.

Rejected cards are a problem for the card holder and the card issuer. Rejected cards are a source of frustration for the card holder, because he cannot use the card in automatic teller machine or point of sale transactions. The card holder must contact the card issuer to obtain a new card. Rejected cards are also a problem for the issuer because consumers will tend not to use the card until a new card is issued. Rejected cards are also a problem for automatic teller machine and point of sale terminal manufacturers because users often blame a rejected card on a problem in the automatic teller machine or point of sale terminal. Often, service calls are made for the automatic teller machine or point of sale terminal when in fact the card itself is defective.

Card issuers have attempted to minimize the number of rejected cards by periodically replacing all cards. However this replacement process is extremely costly. Moreover, when all cards are replaced after a predetermined time, some of the cards will have degraded before the replacement time, and other cards which are replaced have not yet degraded. Accordingly, periodic replacement is not a satisfactory solution.

The magnetic stripe reader art has also attempted to minimize the number of rejected cards by improving the signal decoders to enhance decoding of degraded signals. For example, the above mentioned U.S. Pat. No. 4,254,441 to Fisher discloses a system for reading two-frequency data which employs a read head having an unusually large read aperture and an analog amplitude discrimination and zero slope detection circuit for reading '0' and '1' bits respectively. Another attempt to decode degraded F/2F signals is described in U.S. Pat. No. 4,626,670 to Miller, in which the bit cell width is tracked dynamically to compensate for bit spreading and other degradations which cause the bit cell width to vary. In the Miller patent, the current bit cell width is set as the average of the most recently decoded bit cell widths (for example, the last two bit cells). Unfortunately, this technique has been found to inadequately compensate for bit cell spreading that occurs near a fracture of the magnetic media.

The art has also attempted to read degraded data on cards by performing second and subsequent reads of the card if a first read fails. Unfortunately, each subsequent read attempt on a degraded card further degrades the data. Multiple attempts to read the card further aggravates the signal degradation problem. Moreover, it has been found that often only a portion of the two-frequency data on the card is unreadable, due to a noise pulse, media fracture or other occurrence at a localized portion of the media. However, prior art readers have been unable to regain synchronization of the two-frequency signal after the unreadable portion, so that the entire signal becomes unreadable even though only a small portion is degraded.

SUMMARY OF THE INVENTION

It is therefore an object of the invention to provide a method and apparatus for decoding two-frequency data signals.

It is another object of the invention to provide a method and apparatus for decoding degraded two-frequency signals accurately and efficiently.

It is yet another object of the present invention to provide a method and apparatus for accurately and efficiently decoding degraded two-frequency signals using a single read operation.

It is a still another object of the invention to provide a method and apparatus for accurately and efficiently decoding two-frequency signals notwithstanding the presence of a degraded area therein.

It is still another object of the invention to provide a method and apparatus for optimally initiating replacement of a degraded magnetic stripe bearing card.

These and other objects are provided, according to the present invention, by a method and apparatus for decoding a two-frequency data signal in which samples of the two-frequency data signal are repeatedly obtained as the data signal is read by the magnetic read head and the samples are converted into a series of digital values representing the value (amplitude and polarity) of the data signal during the samples. The two-frequency signal is sampled at a rate which is sufficiently high such that the digital samples accurately represent the two-frequency data signal. An intelligent digital filter, described below, manipulates the digital values to thereby decode the two-frequency data signal.

According to the invention, once the two-frequency signal is sampled and digitized, all manipulation may be performed on the digitized samples so that only a single read of the magnetic stripe need be performed. Multiple reads, which are time consuming and produce further degradation, need not be performed. Moreover, since the decoding is performed digitally, sophisticated digital signal processing techniques may be employed to decode the signal.

According to the invention, the sampled and digitized two-frequency signal may be effectively decoded by detecting the peaks in the sampled signals and then decoding the '1' and '0' bits by analyzing the location and amplitudes of the peaks in the signal. It has been found that in a typical two-frequency signal on magnetic media, the signal peaks are well outside (above and below) the noise band, whereas zero crossings may be more easily corrupted by noise. Accordingly, by detecting the peaks in a sampled signal, more accurate decoding is obtained.

According to one aspect of the present invention, only peaks which are outside a guard band are detected. The guard band is set by establishing a positive and negative threshold, and only detecting peaks which are above the positive threshold or below the negative threshold. Since the peaks are detected by analyzing the digitized samples, the threshold may be varied for optimum peak detection. For example, the thresholds (guard band) may initially be set at a very high value, such as a predetermined percentage of the maximum possible signal amplitude. Peaks are identified by identifying the digital samples having the greatest positive magnitude when the waveform envelope is above the positive threshold and the digital samples having the greatest negative magnitude when the waveform envelope is below the negative threshold. The two-frequency signal is then decoded in a manner described below. If any of the bit cells cannot be decoded properly, the magnitude of the threshold may be decreased, for example by a predetermined percentage, to thereby narrow the guard band. Peaks are again identified using this narrower guard band and the two-frequency signal is again decoded. The guard band may be further narrowed until a minimum allowable guard band is reached. Accordingly, a variable guard band is provided for multi pass decoding attempts of the sampled and digitized two-frequency data signal.

After the peaks have been identified, the displacements, representing the time between peaks, are determined and compared to a bit cell width to detect '0' and '1' bits. A '0' bit is detected if an even number of displacements occur within a predetermined window of the bit cell width, and a '1' bit is detected if an odd number of displacements occur within the predetermined window of the bit cell width. The window of this bit cell is the maximum and minimum width of a valid bit cell. It may be thought of as a bit cell width, plus or minus a tolerance.

According to the present invention, once a bit is decoded, the current bit cell width is incremented by a predetermined amount if the bit cell width of the decoded bit is wider than the current bit cell width, and is decremented by a predetermined amount if the bit cell width of the decoded bit is narrower than the current bit cell width. This contrasts sharply from prior art techniques which maintained a running average of the bit cell width. It has been found that a running average may cause erroneous reading of two-frequency data, while the increment/decrement technique of the present invention provides greater accuracy in reading data. In a preferred embodiment, the current bit cell width is incremented by one when a wider bit cell is found and decremented by one when a narrower bit cell is found.

During the bit detection process described above, it may be found that both an even number or an odd number of displacements are found within the bit cell width window. If this occurs, amplitude tests are also performed to determine which peak in the window has a higher magnitude. The peak with the lower magnitude is disregarded for purposes of bit identification.

During the bit detection process described above it may also be found that no peaks are found within the maximum allowable bit cell window. If this is the case, according to the invention, scanning of the peak data is continued until a valid '0' or '1' bit is found. The area between the previously detected bit and the newly detected bit is delimited as a bad area. An attempt is made to detect the bits in the bad area by analyzing the displacements between all peaks in the bad area, without regard to a threshold or guard band. Any bits so identified are labelled as having a "possible error". Importantly, according to the invention, the existence of a bad area in the two-frequency data does not prevent decoding of subsequent data after the bad area. This feature is beneficial because the bad area may include data that is not needed or is optional for the particular transaction, so that the card need not be rejected.

Once the bits have been detected, they are converted into bytes. It will be understood by those having skill in the art that data may be encoded in a magnetic stripe using five bit, seven bit or other length bytes. Typically each byte includes at least one parity bit. According to yet another aspect of the invention, when converting the bits to bytes, the parity bits are employed not only to check the accuracy of the decoded bits in the byte, but also to correct an unrecognizable bit when a single unrecognizable bit is present. Once the bytes have been assembled, a longitudinal redundancy check (LRC) is performed. If the LRC check is successful, any bytes which were identified as having a possible error are assumed to be error free. On the other hand, if the LRC check is unsuccessful, any bytes which were identified as having a possible error are assumed to be in error. Accordingly, the LRC test is employed for error correction, not merely for error detection. Once all bytes have been assembled, they are provided to a host computer, along with an indication as to which bytes were unrecognizable.

According to yet another aspect of the present invention, during the two-frequency data signal decoding process, many indications of a degraded signal may be obtained. For example, if a detected '0' bit had more than one displacement, or if a detected '1' bit had more than two displacements, there is an indication that a flux perturbation was present even though the bit was properly decoded. If a second pass of the data decoding was necessary, at a lower threshold, there is an indication that a degraded signal is present even though it was decoded properly. Similarly, if a bad area had to be delimited, there is an indication that a degraded signal is present even though it was decoded properly. Finally, if parity or LRC error correction was necessary, there is an indication that a degraded signal is present even though it was decoded properly.

In any such instance, even though the signal was properly decoded, a "degraded signal" indication is provided to the host computer. Upon receipt of such an indication, card replacement may be initiated. The card will be replaced before it becomes unreadable, and before the card holder is inconvenienced. The card issuer may replace cards on an individual basis, at the first sign of degradation without undergoing the expense of periodic replacement of all cards. A similar procedure may be initiated by the host when unrecognized data is received, but the "account number" field has been properly decoded. In this case, card replacement may be initiated immediately, before notification from the card user is received.

It will be understood by those having skill in the art that many of the features of the present invention may be used separately or in various combinations with one another. For example, other two-frequency data signal decoding techniques may be employed with the sampled and digitized dual frequency data signals of the present invention to provide single pass, flexible and efficient decoding. The variable guard band may be employed with the other bit decoding techniques, and the sampling/peak detection techniques and bit detection techniques described above may be employed with analog two-frequency signal decoders. The bit window incrementing and decrementing technique may be employed with other decoding schemes. The host may be informed of a degraded signal during any signal decoding process. Finally, parity and LRC may be employed to correct data in other decoding techniques. However, it will be understood by those having skill in the art that the combination of features described above may be advantageously employed to accurately and efficiently decode two-frequency data and detect early signs of data degradation.

BRIEF DESCRIPTION OF THE DRAWINGS

FIG. 7, illustrate the overall operations of the two-frequency data signal decoding system of the present invention.

FIG. 8 illustrates the operations for creating a peak table, according to the present invention.

FIG. 10, illustrate the operations for searching for synchronization, according to the present invention.

FIG. 12, illustrate the operations for creating a bit table, according to the present invention.

FIG. 18, illustrate the operations for converting bits to bytes, according to the present invention.

FIG. 19, illustrate the operations for finding the start of message character, according to the present invention.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

F/2F DECODING SYSTEM

Figure 2:
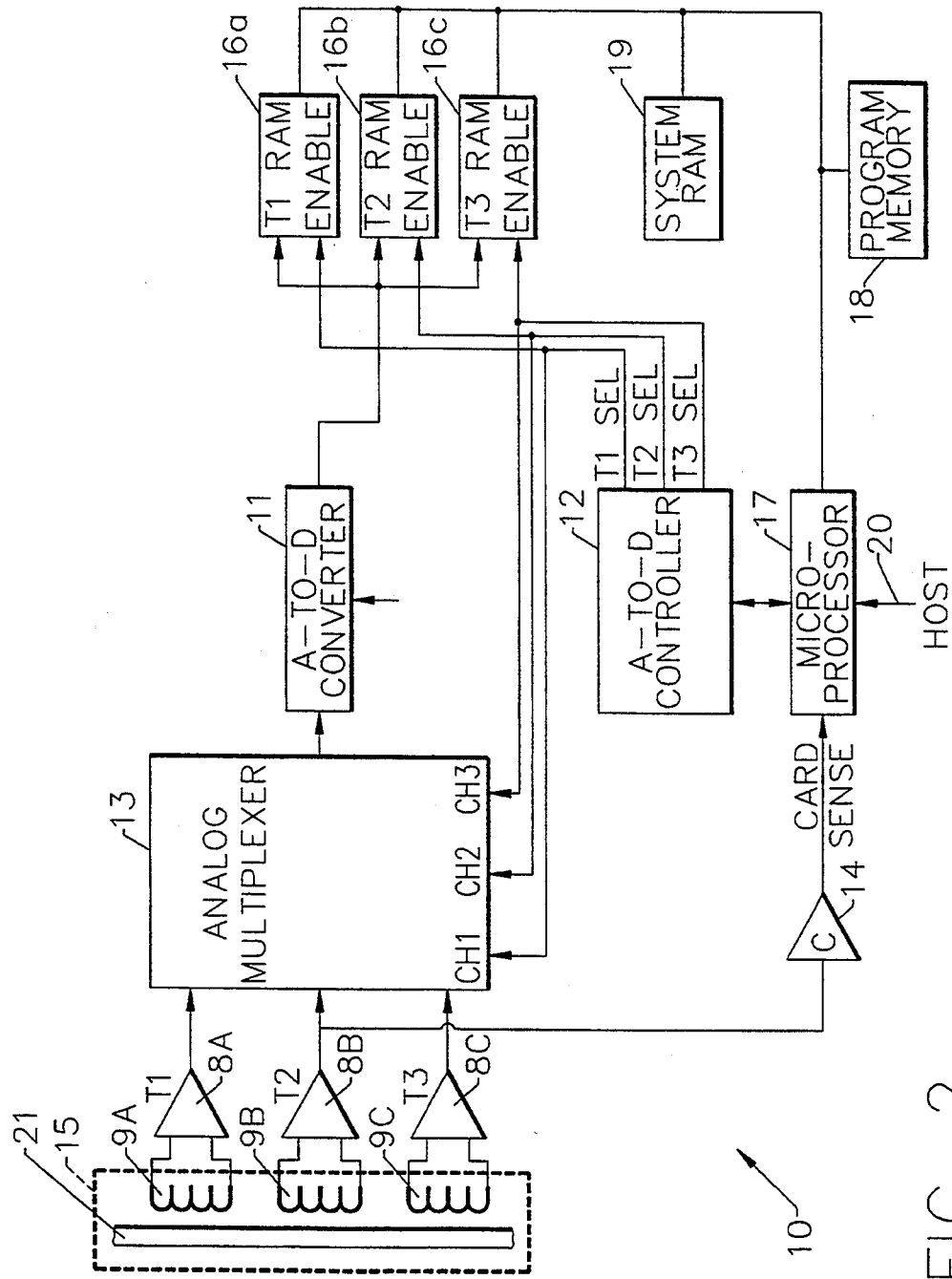
FIG. 2 illustrates an overall block diagram of the two-frequency signal decoding system of the present invention.

Referring now to FIG. 2, an overall block diagram of the F/2F decoding system of the present invention will now be described. The F/2F decoding system 10 comprises a signal digitizer and an intelligent digital filter. The signal digitizer includes analog-to-digital converter 11, analog-to-digital converter controller 12 and optional multiplexor 13. The analog-to-digital converter controller 12 controls analog to digital converter 11 to periodically sample the analog signal derived from the magnetic read head 9 and amplifier 8 of the magnetic stripe reader device 15. The signal recorded on the magnetic media 21 is converted into a stream of digital words that represent the signal's amplitude and polarity at each sample point in time. The digital words are stored in random access memory 16 for later use by the intelligent digital filter.

It will be understood by those having skill in the art that the analog F/2F signal must be sampled at a rate which is sufficiently high such that the stream of digital words accurately represents the analog waveform. Since the analog waveform is often corrupted by noise, sampling must be performed at a rate which is high enough to represent the noise corrupted waveform. In a preferred embodiment, the F/2F waveform is sampled at a rate of at least 10F.

It will be understood by those having skill in the art that in many configurations, the magnetic stripe data is encoded using ANSI standard X4.16-1983 and ISO standard 3554, or later levels of these standards, which can include up to three tracks of magnetic data per stripe. The tracks are referred to, in order from the edge of the magnetic stripe bearing card as Track 1, Track 2 and Track 3 ("T1", "T2", and "T3" respectively). Tracks 1 and 3 are high density tracks (210 bits per inch) while Track 2 is a low density track (75 bits per inch). Track 1, developed by the International Air Transportation Association (IATA), contains up to seventy-nine characters of alphanumeric data for automating airline ticketing or other transactions. Track 2, developed by the American Bankers Association (ABA) includes up to forty characters of numeric data related to financial transactions. Track 3, developed by the thrift industry, contains up to 107 numeric characters which are updated with each transaction.

When a three track ANSI/ISO recording scheme is employed with the present invention, multiplexor 13 may be employed to multiplex T1, T2 and T3 data for use by a single analog to digital converter 11. Separate read head windings 9A-9C and amplifiers 8A-8C may be used, and separate random access memories 16A, 16B, and 16C may be used for T1, T2, and T3 data respectively. Alternatively, three analog to digital converters 11 may be employed, thereby obviating the need for multiplexor 13. It will also be understood by those having skill in the art that F/2F data not conforming to the ANSI/ISO standard may also be decoded. Indeed, one aspect of the present invention allows decoding by ANSI/ISO standard as well as by more relaxed standards.

Still referring to FIG. 2, the intelligent digital filter of the present invention processes the sampled and stored data as will be described below, and provides this data to a host. The intelligent digital filter comprises microprocessor 17 which may operate using a program stored in program memory 18, typically a read only memory (ROM), and its operation is described in detail below. Intermediate data described below may be stored in random access memory (RAM) 19. Microprocessor 17 communicates to a host computer (not shown) via host interface line 20.

It will be understood by those having skill in the art that bidirectional communications take place between the microprocessor (intelligent digital filter) and the host. For example, the host may initiate a read operation. Alternatively, a separate card sense amplifier 14 may trigger a read operation. When the card read operation is complete, the host receives a data buffer from the F/2F data signal decoder system. A number of parameters may also be provided by the host to the intelligent digital filter. Alternatively, these parameters may be set within the intelligent digital filter. These parameters are as follows:

Voltage Threshold ($V_t$)

The voltage threshold is a digital value which must be exceeded before a peak in the raw data is recognized as a valid peak. Since a low threshold increases the chance of losing bit synchronization due to the increased number of noise peaks included the F/2F data, the signal decoder will first attempt to decode signals using a high threshold. If all good data is not obtained, a second decode attempt may be made at an intermediate threshold. If all good data is still not obtained, successively lower thresholds may be used until a lower limit is reached. This process will be described in detail below.

Transport Speed

The transport speed is a value equal to the rate of the card reader's transport.

Zero Bit Displacement, $D_z$

The zero bit displacement defines the initial width of a zero bit, i.e. the assumed width of a bit cell, or the frequency F in the F/2F signal. As will be described below, according to the present invention, $D_z$ is incremented by a predetermined value (e.g. 1), if the difference between the location of two peaks of opposite polarity in the sampled and digitized F/2F signal is greater than the current value of $D_z$, plus a displacement tolerance. The displacement tolerance, called DV0, defines a window about which the bit cell width can vary.

The initial zero bit displacement $D_z$ may be provided by the host or may be determined from the sampling rate and transport speed. It will be understood by those having skill in the art that the '1' bit displacement is half the '0' bit displacement $D_z$. A '1' bit displacement tolerance $Dv_1$ may also be employed to define a window around the '1' bit displacement. In a typical ANSI/ISO standard card decode, the controller 12 controls converter 11 to sample the encoded F/2F data at one sample per 40 microseconds per track. Accordingly, representative values for $D_z$, DV0 and $Dv_1$ in this embodiment for tracks 1-3 are as follows:

|                | $D_z$ | DV0 | $Dv_1$ |
| --- | --- | --- | --- |
| Tracks 1 and 3 | 15 | 4 | 3 |
| Track 2 | 42 | 14 | 7 |

It may be seen that Tracks 1 and 3 are sampled at a rate of 15F and Track 2 is sampled at a rate of 42F.

Track Fracture Count

The track fracture count may also be provided by the host. According to the invention, the number of invalid flux transitions in between clock signals are counted during the decoding process. When this number equals the fracture count a degraded card is detected and flagged to the host. Typically, the track fracture count will be zero so that the first perturbation in the magnetic media will cause the media to be flagged as degraded and flagged to the host. Accordingly, a "noisy" card may be detected and flagged long before the card becomes imperative. The noisy card may be replaced without undue burden to the user.

F/2F DECODER OPERATIONAL OVERVIEW

An overview of the operation of the F/2F decoder of the present invention will now be described. Upon receipt of a read signal, indicating that a card has been inserted into the card reader, the data signal is sampled, for example at a rate of 40 microseconds per sample, and digitized. The digitized data is stored in a "Raw Data Table" RAM 16 of FIG. 2. Each sample may be stored as an eight bit byte with hexadecimal 80 (x'80') being the zero reference line for the read signal. The maximum value for a positive flux transition may be x'FF', and x'00' may be the maximum value for a negative flux transition.

Figure 1:
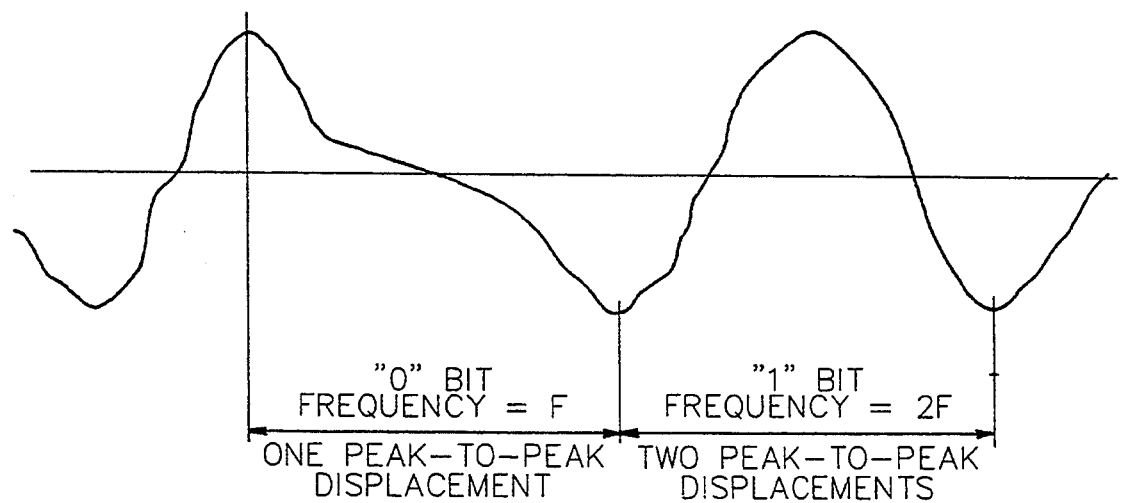
FIG. 1 illustrates a sample of a two-frequency data signal waveform.
Figure 3:
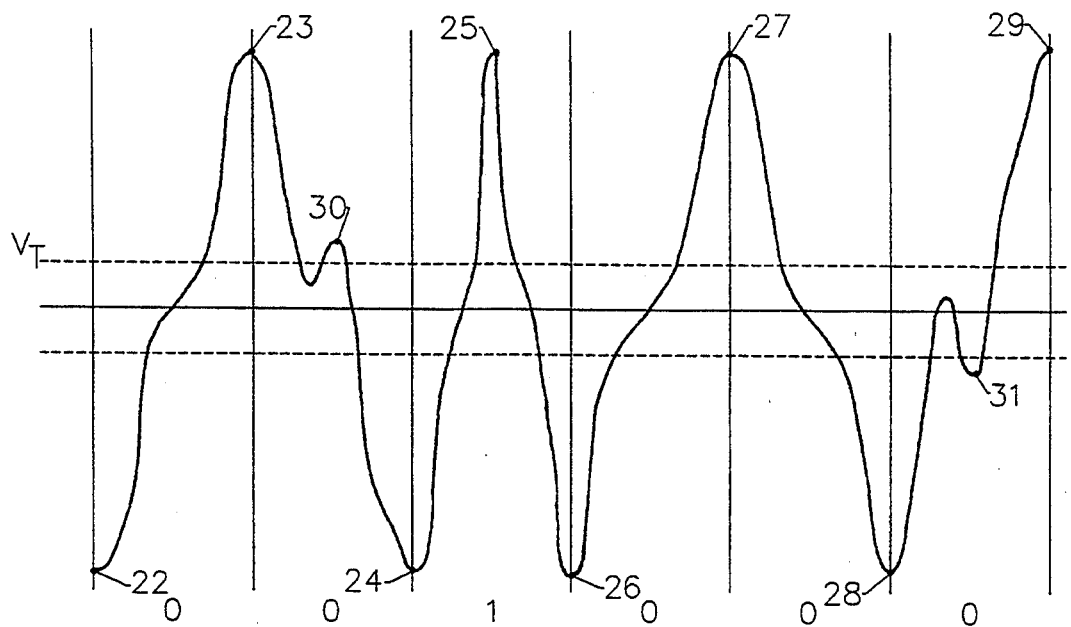
FIG. 3 illustrates a two-frequency data signal waveform having peaks outside a guard band, according to the present invention.

The microprocessor 17, under control of an intelligent digital filter program in program memory 18, locates those peaks in the raw data having the greatest amplitude while the waveform envelope is above or below a threshold $V_t$. In other words, the data is analyzed to locate each peak with the greatest positive magnitude while the waveform envelope is above the positive threshold $V_t$, and each peak with the greatest negative magnitude while the waveform envelope is below the negative threshold $-V_t$. The addresses of the located peaks are saved in a "Peak Table". For example, referring to FIG. 3, the peaks labelled 22-29 will be included in the Peak Table. The peaks labelled 30 and 31 will not be included in the Peak Table, even though they are above and below the threshold, respectively, because they are not the largest amplitude peaks while the data is above and below the threshold, respectively. The Peak Table may be located in RAM 19 (FIG. 2) and may store the two byte addresses of the samples in the Raw Data Table which correspond to the peaks.

A "Bit Table" is then created from the Peak Table. The difference between the addresses of two adjacent peaks, referred to as "displacement", is compared with the current zero bit displacement (D$_z$), plus or minus the displacement variation tolerance DV0 to determine whether a '0' bit has been found. A '0' bit will usually be comprised of a single displacement. A '1' bit will usually be comprised of the addition of two contiguous displacements. However, the addition of more than one displacement may constitute a '0' bit and more than two contiguous displacements may constitute a '1' bit if a fracture in the magnetic media caused a flux transition. The detailed process for decoding the bits from the Peak Table will be described below.

Figure 4:
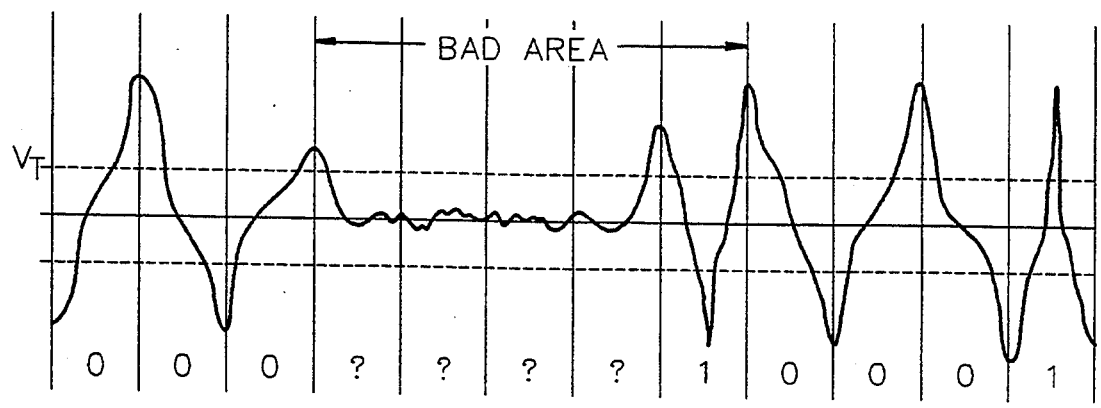
FIG. 4 illustrates a two-frequency data signal waveform having a bad area therein, according to the present invention.

When searching for bits, if an area greater than the bit window is encountered without any peaks, this area is flagged as a "bad" area of the card until a zero bit is again encountered. If the bad area of the card is an integer multiple of the bit cell width, then the bad area is flagged and Bit Table creation continues after the bad area. Thus, according to the present invention, a bad area in the card does not mean that the card is rejected as unreadable. Rather, bit cell synchronization is not lost, and bit decoding continues after the bad area. See FIG. 4.

Figure 5:
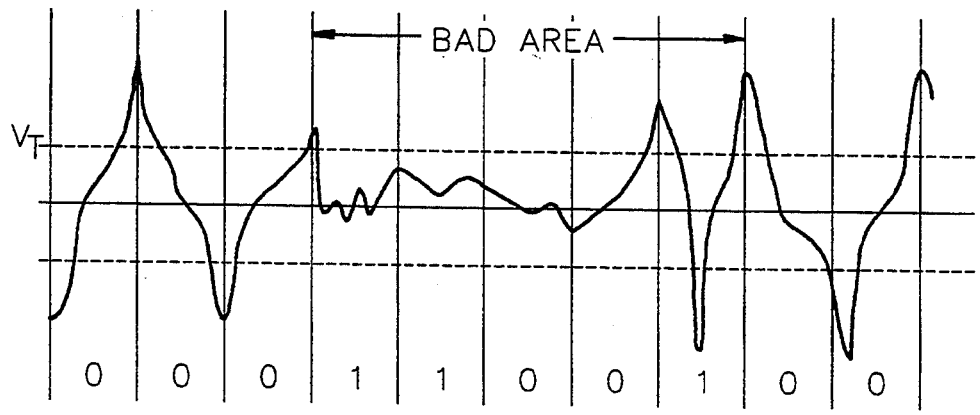
FIG. 5 illustrates a two-frequency data signal waveform having decoded bits in a bad area therein, according to the present invention.

When a bad area of the card is encountered, a Detailed Peak Table is made from the raw data between two peaks known to be on bit boundaries. The Detailed Peak Table contains all peaks; i.e. a threshold is not used. A bit detection algorithm is used to decipher bits from the noise using the Detailed Peak Table. All bits deciphered in the bad area are marked as "possible" '1' or '0' bits. See FIG. 5 for an illustration of a bad area having data which is identified as possible 1's and 0's in the Detailed Peak Table.

Once the bits have been determined, the bits are converted into track data or bytes. Parity and Longitudinal Redundancy Code (LRC) checking is employed in an attempt to verify whether the "possible" '1' or '0' bits are truly '1' or '0' bits. If the "possible" '1' or '0' bits are found to be truly '1' or '0' bits, they are flagged as such. If they cannot be found to be true '1' or '0' bits, they are flagged as unreadable. In particular, single bit errors may be corrected using odd parity. Multiple bit errors cause the character to be flagged as bad.

Figure 6:
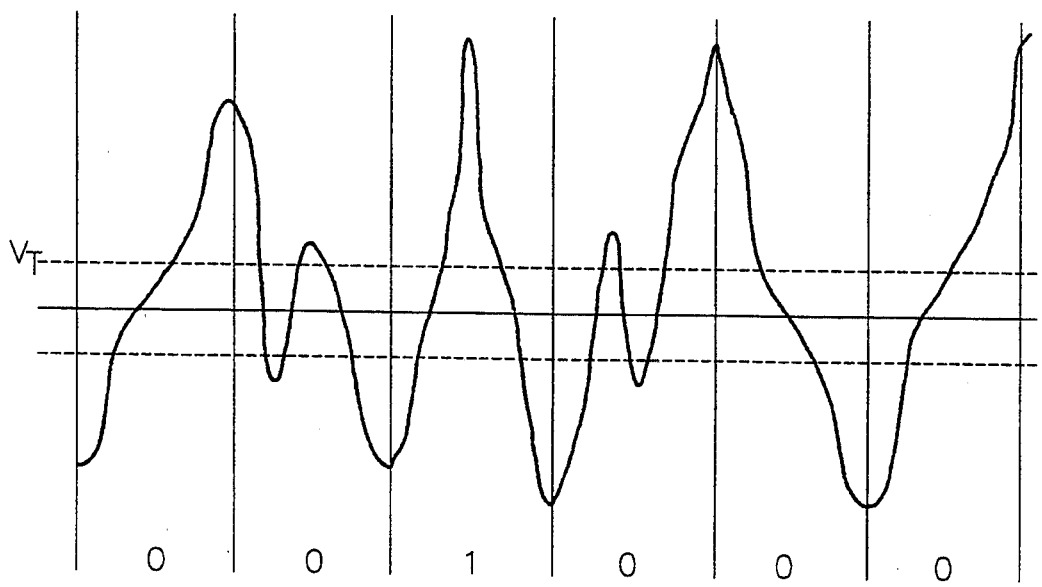
FIG. 6 illustrates a two-frequency data signal waveform having decoded bits with perturbations, according to the present invention.

Finally, the byte data is transmitted to the host along with an indication as to whether a degraded card was read. The card may be flagged as degraded if more than two displacements were needed to determine a bit. See for example the second and third "0" bits of FIG. 6 which include two perturbations but are nonetheless found to be '0' bits. These bits were correctly read but the card is flagged as degraded. The card may also be flagged as degraded if a Detailed Peak Table had to be created. Other parameters may be employed to flag a degraded card so that the card can be replaced before it is rendered unreadable.

According to another aspect of the invention, if a card is unrecognizable but if the account field is intact, the host can cause a new card to be issued to the individual. Accordingly, a new card will be issued in the case when the account number is recognizable, without the need for the user to contact the card issuer. A major course of user inconvenience is thereby eliminated.

DETAILED OPERATION OF THE F/2F DECODING SYSTEM

Figure 7A:
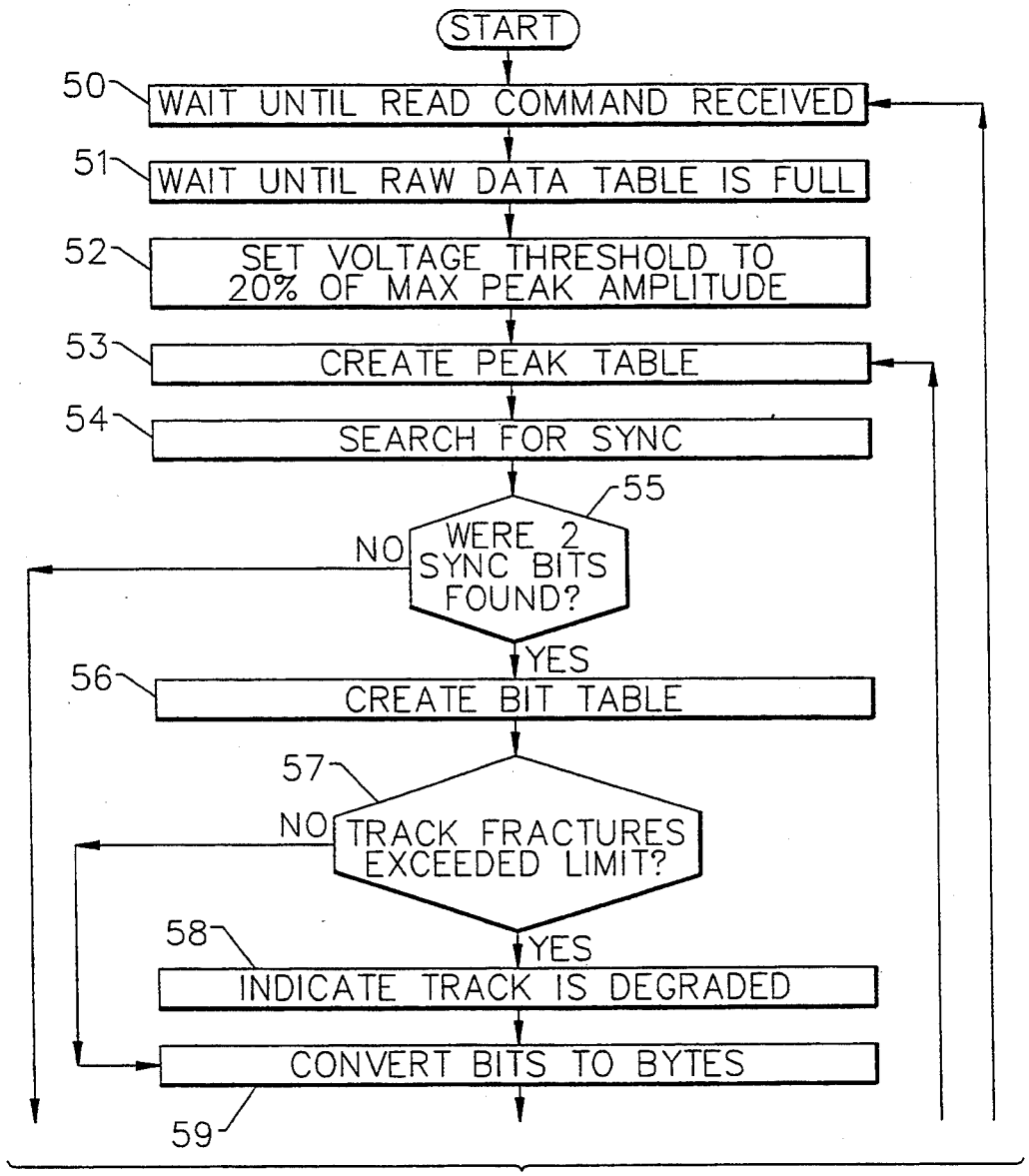
FIGS. 7A and 7B, which together form
Figure 7B:
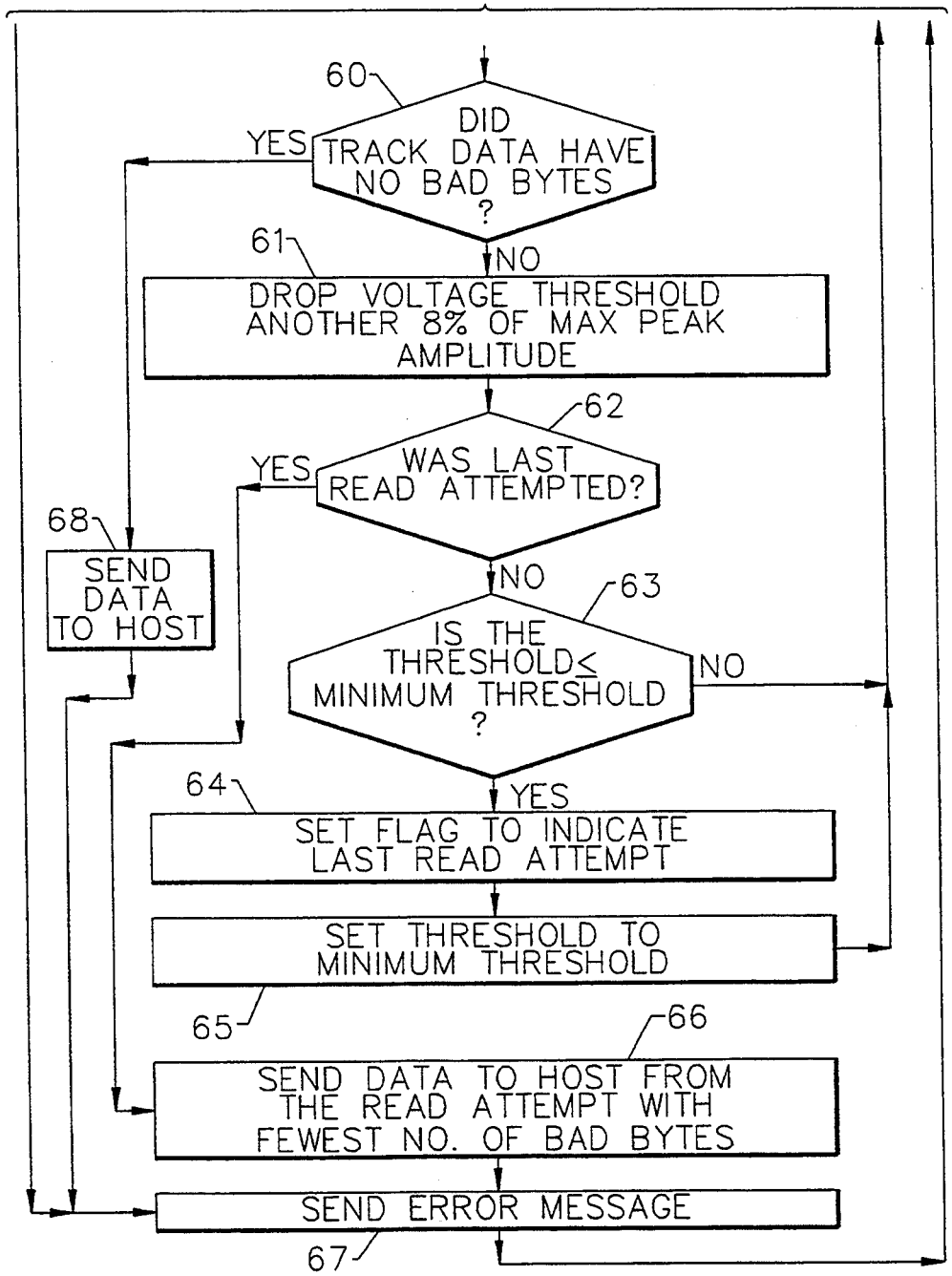

Referring now to FIG. 7, the detailed operation of the F/2F decoding system of the present invention will be described. It will be understood by those having skill in the art that the operation of FIG. 7 may be implemented by a stored program which runs on microprocessor 17 of FIG. 2, although hardware logic implementations may also be provided. Referring now to FIG. 7, operation begins by waiting until a read command is received (Block 50). The read command may be received directly from the host or from a sensor (14, FIG. 2) in the magnetic stripe reader, or other means. The analog-to-digital controller 12 (FIG. 2) controls analog to digital converter 11 (FIG. 2) to repeatedly sample and digitize the F/2F data signal and place the digital values of the sample in a Raw Data Table, located for example, in RAM 16 of FIG. 2).

Returning again to FIG. 7, when the Raw Data Table is full (Block 51), the voltage threshold $V_t$ is set to a first (highest) value, such as twenty percent of the maximum peak amplitude of the expected F/2F signal voltage. The voltage threshold $V_t$ may be calculated as a percentage of the highest digital sample encountered or as a percentage of the maximum possible amplitude, or may be set at a fixed number based on expected amplitudes of typical cards.

Based upon the set threshold, a Peak Table is created at Block 53. The detailed operation for creating a Peak Table will be described further below in connection with FIG. 8. In general, the Peak Table is created by searching through the Raw Data Table for peaks. The digital samples having the greatest positive magnitude when the waveform envelope is above the positive threshold, and the digital samples having the greatest negative magnitude when the waveform envelope is below the negative threshold, will have their two byte addresses saved in the Peak Table. It will be understood that a peak which has a magnitude with an absolute value less than the voltage threshold, $V_t$, will not be saved in the Peak Table.

After the Peak Table is created a search for synchronization bits is performed, at Block 54. The details of searching for synchronization will be described in connection with FIG. 10. In general, a search for at least two contiguous '0' bits is performed. The first '0' bit address displacement must be equal to the initial $D_z$ plus or minus DV0, i.e. it must be within the initial window for a bit cell. Once a displacement falls in this range, according to the invention, the '0' bit address displacement is incremented by '1' (or another predetermined amount) if the new $D_z$ is greater than the current $D_z$, and the '0' bit displacement is decremented by '1' (or another predetermined amount) if the new $D_z$ is less than the current $D_z$. When two contiguous '0' bits are found, synchronization has been obtained, and bits are then created from the remaining peaks as described below.

The above described '0' bit displacement incrementation and decrementation provides a more accurate method of maintaining the bit cell window width than prior art methods which, for example, maintain a running average of the last two bit cell widths. For example, if an average bit cell width was 42, and 7 adjacent bit cells widths were 42, 42, 56, 30, 42, 42, and 42, and the '0' bit tolerance was 14, the bit cell width of 30 would be rejected as a bit cell by the prior art technique, because the average of the first three numbers (42, 42, and 56) is 46.666, which is more than 14 greater than 30. However, 30 clearly should be considered a bit cell since it is well within the 42±14 width. This phenomenon of bit cell width expansion occurs when the magnetic media comprising a bit cell is damaged in a particular area. The bit cell following the larger than average bit cell is usually shorter than average. However the average of the larger and smaller bit cell widths is usually close to the average bit cell width. According to the present invention, a running average is not employed to identify bit cells. Instead '1' is added to the stored bit cell width if the current bit cell is greater, and '1' is subtracted from the stored bit cell width if the current bit cell width is less. In the above example, according to the present invention, encountering a bit cell of 56 would increase the stored bit cell width from 42 to 43. Thus, 30 does fall in the range of 43±14 and is recognized. The 30 value would decrease the stored bit cell width from 43 to 42 again.

Still referring to FIG. 7, at Block 55 a test is made as to whether two synchronization bits were found. If not, an error message is sent to indicate the card is unreadable (Block 67). If two synchronization bits were found, then the Bit Table is created at Block 56. The detailed creation of a Bit Table will be described below in connection with FIG. 12. However, in general, bit recognition is a function of peak displacement and amplitude. Each peak to peak address displacement following the second '0' bit found in the search for synchronization routine (Block 54) is compared with $D_z \pm DV0$.

However, even when two $\frac{1}{2}D_z$ or one $D_z$ displacements have been found, this is not conclusive evidence that a '1' or '0' bit, respectively, has been found. When a '1' or '0' bit is believed to be found, further displacements are added until the total displacement closest to $D_z$ is found. In most cases, if the total displacement is made up of an odd number of individual displacements, then a '0' bit has been found. Conversely, an even number of individual displacements indicates a '1' bit. There are exceptions to this rule. For example, if a '1' bit (2 displacements) has been found which satisfies the tolerances, and a third displacement makes the total displacement even closer to the known bit window boundary ($D_z$), then the amplitude of the last peak of the third displacement is compared to the first peak of the third displacement. If the last peak's amplitude is less than the first peak's amplitude, then the third displacement is not considered to be part of the bit and a '1' bit is saved in the Bit Table. The third displacement is then used as a first displacement of the next bit. However, if the last peak's amplitude is greater than the first peak's amplitude, then the third displacement is considered to be part of the bit and a '0' bit is saved in the Bit Table.

If the total address displacement is greater than $D_z + DV0$, then a Detail Peak Table is created and an attempt is made to decipher bits in the noisy area. Even when the number of bits found in the bad area is equal to the number of expected bits in the bad area, and bits are deciphered, the deciphered bits are still labelled as "possibly error" until they are verified later.

During creation of the Bit Table, whenever more than one address displacement is needed to equal a '0' bit displacement or more than two address displacement is needed for a '1' bit, the track fracture count will be incremented. Then, if the track fracture count is greater than a predetermined track fracture count, preferably zero (Block 57), a degraded track indication is provided (Block 58) to notify the host that the first signs of card degradation have occurred and that the card should be replaced.

After the Bit Table has been created, the bits are converted to bytes at Block 59. The details of the conversion of bits to bytes will be described in connection with FIG. 18. However, in general, this operation constructs bytes from the Bit Table by grouping the appropriate number of bits (5 for tracks 2 and 3, or 7 for track 1) in reverse order to form bytes, with the unused high order bits in each byte being set to zero. When attempting to read an assembled byte with a single bad bit, the bad bit is first treated as a zero. Then, if odd parity is not satisfied, it is toggled and treated as a '1' which will correct the parity. Bad parity is set in the return code field when two or more bits in the character are bad. If there is more than one bad bit in a byte, bit correction will not be performed because a definite determination of the plurality of two or more bad bits cannot be made.

If the track data had no bad bytes (Block 60), then the data is sent to the host (Block 68) along with any error message (Block 67). However, if the track data had bad bytes (Block 60), then at Block 61 the threshold $V_t$ is dropped by a predetermined amount, for example by 8% of the threshold used in Block 52. If the voltage threshold limit has been reached (Block 62), then the data is sent to the host from the decode attempt with the fewest number of bad bytes (Block 66). Otherwise, assuming that the software threshold is less than or equal to minimum threshold (Block 63), a flag is set to indicate the last read attempt (Block 64) and the software threshold is set to the minimum threshold. In any event, a new Peak Table is created at Block 53 and processing of the Peak Table is performed at the lower threshold. The threshold continues to be lowered until the minimum threshold is reached.

DETAILED OPERATION—CREATING PEAK TABLE

Referring now to FIG. 8, the details of creating a Peak Table (FIG. 7, Block 53) will now be described. After describing the operations to create a Peak Table, a specific example will be described using the waveform of FIG. 9. It will be recalled that the Peak Table is created from the Raw Data Table which contains a sequential listing of the digital values of the sampled converted F/2F signal.

Referring to FIG. 8, processing begins by initializing a pointer to the start of the Peak Table (Block 71) and initializing a pointer to the start of the Raw Data Table (Block 72). The first data value from the Raw Data Table is obtained (Block 73) and the address of the first data value is saved in the Peak Table (Block 74). The Raw Data Table pointer is incremented (Block 75) and, if the end of the Raw Data Table has been reached (Block 76), processing returns (Block 77) to Block 54 of FIG. 7.

Assuming the end of the Raw Data Table has not been reached, the data value from the Raw Data Table is obtained (Block 78), and a comparison is made as to whether the data value being processed is outside the guard band (i.e., greater than $V_t$ or less than $-V_t$) or inside the guard band (i.e., less than V: and greater than $-V_t$), at Block 79. This determination may be made by determining whether the absolute value of the data value of the current point minus the data value at the zero volt reference is less than or equal to the absolute value of the data value of the threshold minus the data value at the zero volt reference. If the data point is inside the guard band then the Raw Data Table pointer is incremented to the next value at Block 75 because a data value within the guard band is not considered for Peak Table inclusion.

On the other hand, if Block 79 determines that the data value is outside the guard band, then it must be determined if a possible peak has been found. As previously described, the system ensures that only one peak is found between two adjacent threshold crossings. This is done at Block 80 by determining whether the sign of the data value of the current point minus the data value of the zero volt reference is opposite from the sign of the data value of the current peak minus the data value of the zero volt reference. If the sign is opposite, then the Peak Table pointer is incremented at Block 81 because the current point and not the previous peak is the true peak. Finally, at Block 82 a comparison is made as to whether the absolute value of the data value of the current point minus the data value at the zero volt reference is greater than the data value of the current peak minus the data value of the zero volt reference. If not, then the Raw Data Table pointer is incremented at Block 75. However, if it is greater, then at Block 83 the current Peak Table entry is replaced with the address of the data value of the current point.

To summarize, the processing described in connection with FIG. 8 ensures that (1) only peaks outside the guard band (i.e. greater than the positive threshold or less than the negative threshold) are included in the Peak Table and (2) only one peak is found between adjacent threshold crossings.

Example—Creating Peak Table

Figures 9A, 9B, 9C:
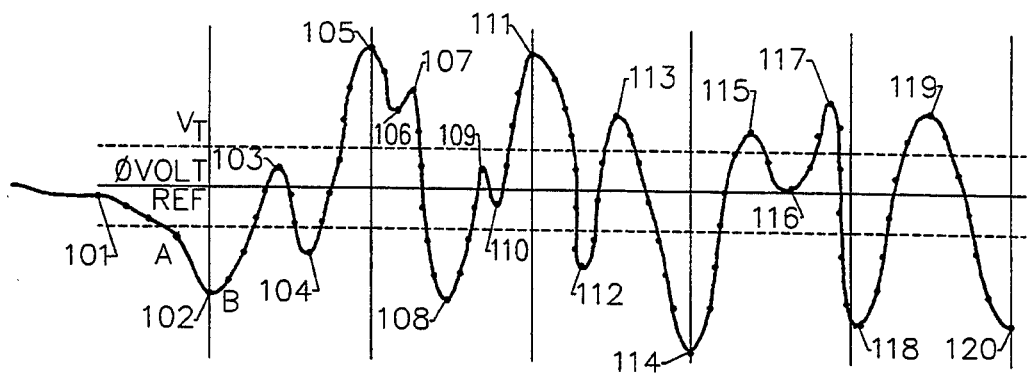
FIGS. 9A–9C illustrate sample waveform and table configurations for the operations of FIG. 8.

Referring now to FIG. 9, the creation of a Peak Table (illustrated in FIG. 9C) from a Raw Data Table (illustrated in FIG. 9B) for the sampled and digitized F/2F data signal illustrated in FIG. 9A, according to the operation of FIG. 8 will now be described. All amplitude values will be hexadecimal, denoted by x". As shown in FIG. 9A, the zero volt reference is x'80' and the voltage thresholds are x'A0' and x'60'. The Raw Data Table shown in FIG. 9B is assumed to have the hexadecimal value of each of the samples illustrated by dots on the waveform of FIG. 9A. After the pointers are initialized to the start of the Peak Table and the Raw Data Table (Blocks 71–72), the first data value from the Raw Data Table is obtained, i.e. ADDR101, and saved in the Peak Table (Block 74).

The Raw Data Table pointer is then incremented to point to address A (the second value in the Raw Data Table) and the data value x'50' is obtained (Block 78). The comparison of Block 79 is then made. The comparison is $|x'50'-x'80'| \leq |x''A0'-x'80'|$ or $30 \leq 20$. Since the test fails, the comparison of Block 80 is performed. Since the sign is not opposite, the comparison of Block 82 is performed. In the comparison of Block 82, $|'50'-x'80'| => |x'60'-x'80'|$ or $30>20$, so that the test passes and the current Peak Table entry is replaced with the address of the data value of the current point. In other words the first entry in the Peak Table is replaced by ADDRA rather than ADDR101. The same process will occur for subsequent samples until 102 is reached. Sample 102 will replace the previous samples as the first address in the Peak Table.

Sample B follows sample 102. For sample B the test of Block 79 obtains $|x'20'-x'80'| \leq |x'A0'-x'80'|$ or $60 \leq 20$. Since this test fails, the test of Block 80 is made. Since the sign is not opposite, the test of Block 82 is made. This test is $|x'20'-x'80'| > |x'10'-x'80'|$ or $60>70$. Since this test fails, the Raw Data Table pointer is incremented but the current address is not replaced by the address in the Peak Table. Accordingly, the address of sample 102 remains in the Peak Data Table and is not replaced by the address of sample B.

The same operations are performed for subsequent samples. Accordingly, sample 103 is not included as a peak because the first test of Block 79 fails (i.e. sample 103 is within the guard band). Sample 104 is also not included because it is a lower magnitude peak. For sample 104 the first test of Block 79 results in $|x'50'-'80'| \leq x'A0'-x'80'|$ or $30 \leq 20$. Since this test fails and since the sign is not opposite, the test of Block 82 is performed. This test is $|x'50'-x'80'| > |x'10'-x'80'|$ or $30>70$. Since this test also fails, the address of sample 104 is not placed in the Peak Table.

Similar processing continues for the remainder of the waveform of FIG. 9A so that at the conclusion of processing the only peaks found in the Peak Table will be 102, 105, 108, 111, 112, 113, 114, 117, 118, 119, and 120. It will be seen that only the highest amplitude peak between adjacent threshold crossings have been retained and that peaks within the guard band are not retained.

DETAILED OPERATION—SEARCH FOR SYNCHRONIZATION

Figure 10A:
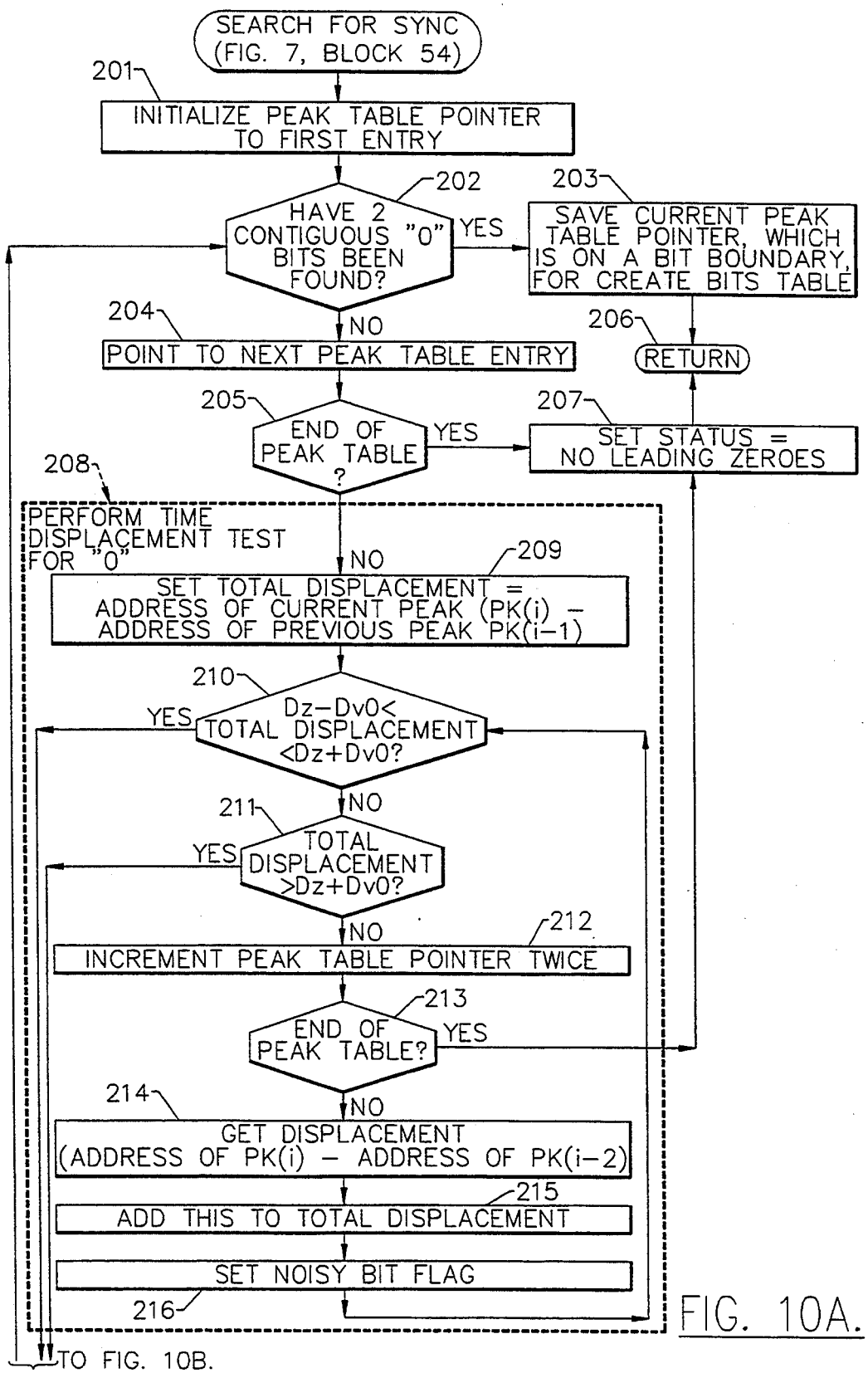
FIGS. 10A and 10B, which together form
Figure 10B:
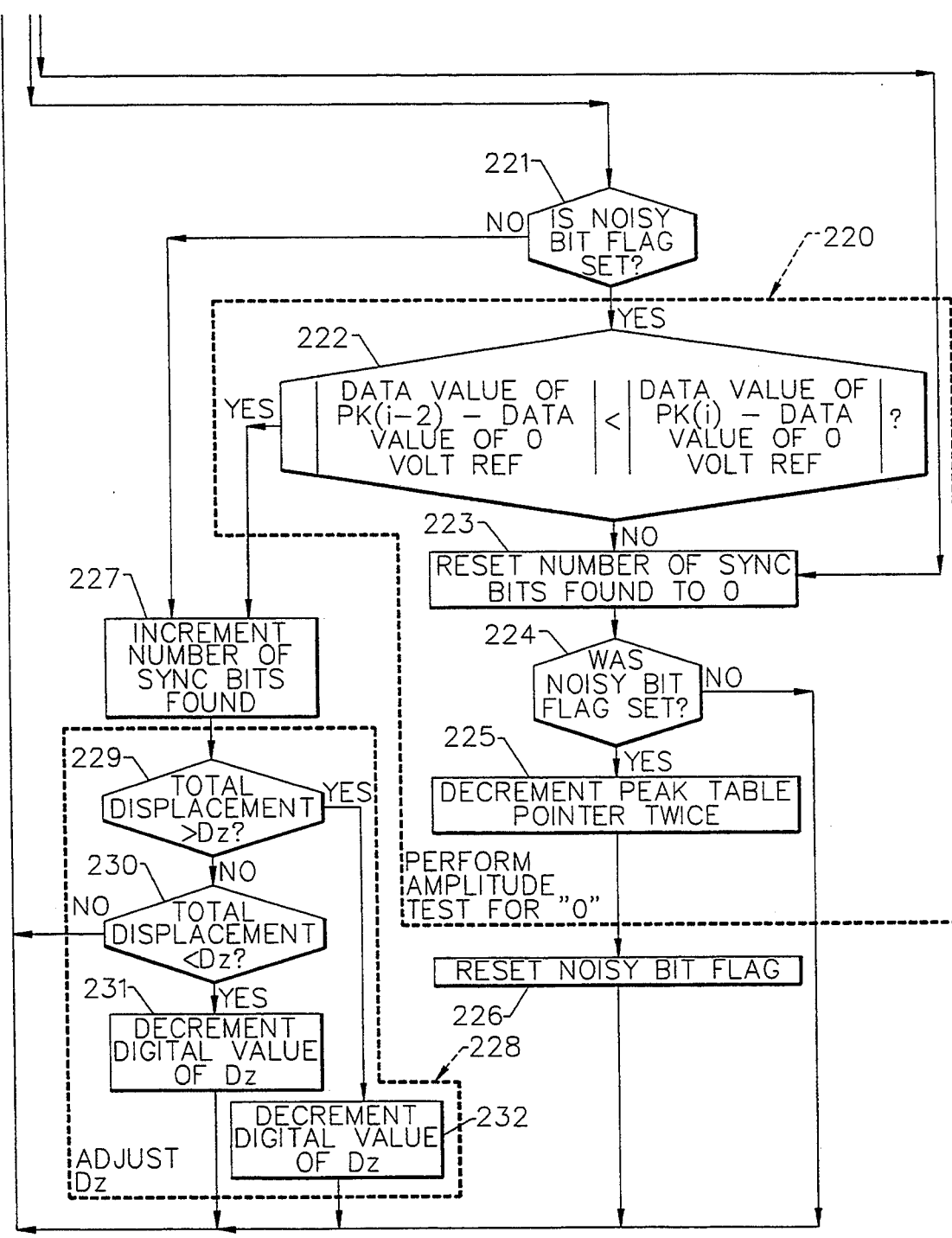

Referring now to FIG. 10, the detailed operations performed in searching for synchronization (Block 54 of FIG. 7) will now be described. The operations will first be described and then a specific example illustrated in FIG. 11 will be described. The search for synchronization operation described in FIG. 10 searches for two adjacent '0' bits in the sampled and digitized F/2F data. It will be recognized by those having skill in the art that F/2F data encoded in ANSI/ISO or other formats typically begins with a plurality of '0' bits for synchronization purposes. It will also be understood by those having skill in the art that, according to the present invention, more than two adjacent '0' bits may be found to obtain synchronization.

In the operation of FIG. 10, two adjacent '0' bits are decoded to obtain synchronization. Each '0' bit is decoded by performing a time displacement test and an amplitude displacement test. The time displacement test ensures that the bit window for the '0' falls within the pre-existing bit window plus or minus a predefined tolerance, i.e. $D_z \pm DVO$. Assuming the displacements fall within the window, an amplitude displacement test is performed to ensure that the '0' amplitude is correct. After the '0' bit has been identified, the $D_z$ parameter is adjusted by $\pm 1$ according to the present invention.

Referring now to FIG. 10, the search for synchronization begins by initializing the Peak Table pointer to the first entry (Block 201). If two '0' bits have already been found (Block 202) then the current Peak Table pointer, which is on a bit boundary, is saved at Block 203 for use in the "creates Bit Table" operation (FIG. 7, Block 56) and processing returns to Block 55 of FIG. 7 (Block 206).

Assuming two '0' bits have not been found, the pointer is moved to the next Peak Table entry (Block 204) and a test is made, at Block 205, for end of Peak Table. If the end of Peak Table has been reached and no '0' bits have been found, a status message is sent to indicate that no leading '0' bits have been found (Block 207) and the card is unreadable.

Assuming the end of Peak Table has not been reached, then at Block 208 a time displacement test is performed to find a "0". The time displacement test is performed by setting the total displacement equal to the address of the current peak, PK(i), minus the address of the previous peak, PK(i−1). A test is then made as to whether the total displacement between the current peak and the previous peak is within the '0' bit displacement window, i.e. is within $D_z \pm DVO$. If it is, then an amplitude displacement test is performed to ensure that a '0' bit has been identified, at Block 220. This amplitude displacement test will be described in detail below.

If the total displacement between the current peak and the previous peak is not within the zero bit window, a check is made at Block 211 as to whether the total displacement is greater than the maximum allowable zero bit displacement, i.e. $D_v + DVO$, at Block 211. If so, it is assumed that a '0' bit has not been found and the number of synchronization bits found is reset to zero (Block 223). Assuming however that the total displacement has not yet exceeded the maximum length, the Peak Table is incremented twice (Block 212) because the '0' bit locate test looks for an even number of peaks.

Assuming the end of Peak Table has not been reached (Block 213), the displacement between the current peak and the second previous peak is computed at Block 214 and added to the total displacement. Since we are now looking at a bit which has a perturbation, (i.e. a pair of peaks which do not count) the noisy bit flag is set at Block 216. The total displacement test then is performed on the new total displacement starting at Block 210.

Two results can occur from the total displacement test. In one result, an even number of peaks is found which have a total displacement within the bit cell window. If this is the case, and more than two peaks were found (i.e. it is a noisy bit), then an amplitude displacement test is performed to test for zeros. Otherwise, the number of synchronization bits found is set to one and the search begins for a second synchronization bit. In particular, referring to Block 221, after a total displacement is found within the window a test is made as to whether the noisy bit flag has been set, to indicate that more than two peaks have been found in the total displacement window. If more than two peaks have not been found (i.e. the noisy bit flag has not been set) then the number of synchronization bits is incremented (Block 227) to indicate that a valid '0' bit has been found, i.e. a pair of peaks within the displacement window. On the other hand, if the noisy bit flag has been set because there were intermediate peaks between the pair of peaks, a test must be made as to whether the last peak found is higher in amplitude than the supposed noise peak. This amplitude test is performed in Block 220.

In particular, at Block 222 a test is performed as to whether the absolute value of the amplitude of the previous peak is less than the amplitude of the current peak. If yes, then it is assumed that since the current peak amplitude is higher than the previous peak, that the previous peak was a noise peak and that the current peak indicates the actual bit cell width. Accordingly, the number of synchronization bits found is incremented (Block 227). On the other hand, if the current peak has an amplitude lower than the intermediate peak, it cannot be assumed that a valid '0' bit has been found, so the number of synchronization bits is reset to zero at Block 223. If the noisy bit flag was set, to indicate that an intermediate peak was found (Block 224), then the Peak Table pointer is decremented twice, at Block 225, so that the test for '0' may start looking at the intermediate peak. In other words, the intermediate peak may be the valid starting point of a '0' bit. The noisy bit flag is reset and operations again search for a '0' bit at Block 202.

On the other hand, if a valid number of synchronization bits has been found, and the number of synchronization bits have been incremented at Block 227, then the bit cell value $D_z$ is adjusted to take into account the recently found bit window at Block 228. Accordingly, if the total displacement is greater than $D_z$ (Block 229), the digital value of $D_z$ is incremented by a predetermined amount (Block 232). Preferably, the digital value of $D_z$ is decremented by '1'. On the other hand, if the total displacement found is less than the present value of displacement (Block 230), then the value of $D_z$ is decremented by a predetermined amount, preferably '1', at Block 231. It will be understood by those having skill in the art that the incrementing and decrementing technique provides superior results over prior art averaging techniques.

EXAMPLE—SEARCH FOR SYNCHRONIZATION

Figure 11A:
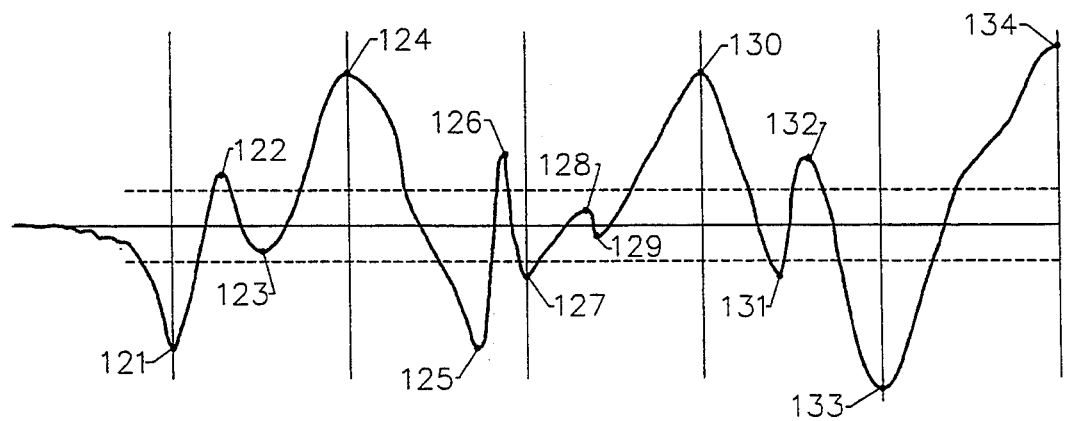
FIGS. 11A–11B illustrate a sample waveform and table configurations for the operations of FIG. 10.
Figure 11B:
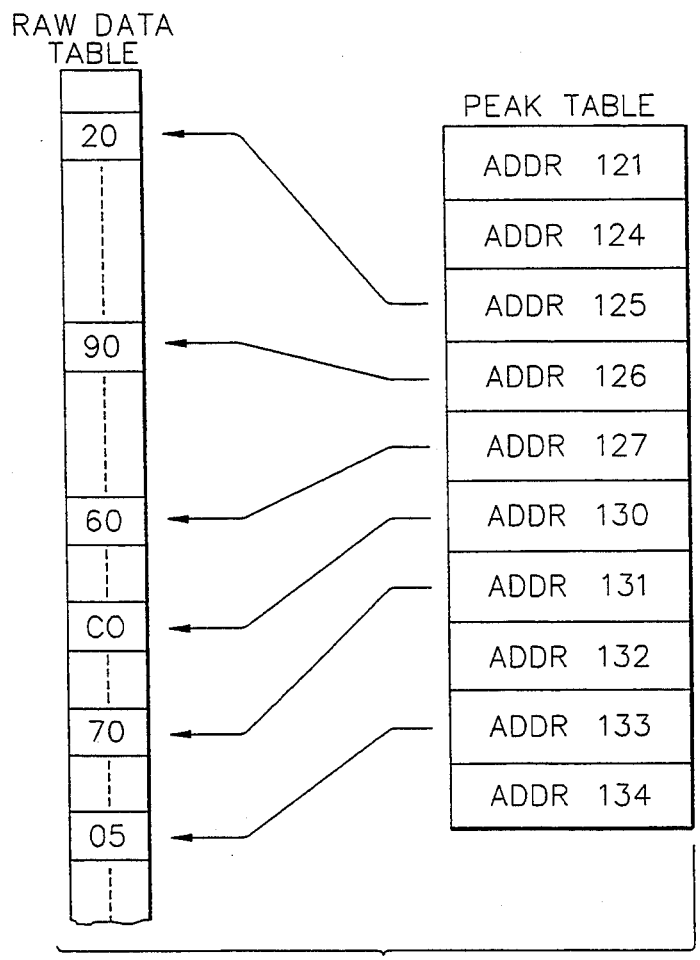

Referring now to FIG. 11, the operations performed in searching for synchronization will now be illustrated for the waveform of FIG. 11A, using the Raw Data Table and Peak Table shown in FIG. 11B. This example will illustrate finding a '0' for the first bit, followed by failure to find a '0' for the second bit, followed by finding two consecutive '0' bits for the second and third bits.

Referring to FIG. 11, it is assumed that the first peak in the Peak Table is bit 121 (Block 201). The Peak Table pointer is then moved to the next Peak Table entry, i.e. the address of point 124. It will be understood that points 122 and 123 are not in the Peak Table. Then, at Block 209, the total displacement is set to the address of the current peak minus the address of the previous peak, i.e. the address of sample 124 minus the address of sample 121. For purposes of this example, it is assumed that this address difference equals 40. A test is then made as to whether the total displacement is within the bit cell window. For purposes of this example, it will be assumed that the initial bit cell window is set at 42 and DV0 is set at ±14. Accordingly, the displacement is within the window. Since the noisy bit flag was not set (Block 221), the number of synchronization bits is incremented to one at Block 227.

Since the total displacement $D_z$ of 40 is less than the previously set $D_z$ of 42, the total displacement $D_z$ is decremented to 41. The second bit is then examined. The Peak Table pointer is moved to the next Peak Table entry (Block 204) i.e. the address of sample 125, and the displacement between the address of samples 125 and 124 is computed at Block 209. This total displacement is assumed to be 25. At Block 210 a check is made as to whether this displacement of 25 is within the window, i.e. a check is made as to whether $41-14<25<41+14$. Since it is not, and it is not outside the window, the Peak Table pointer is incremented twice to the address of sample 127 and the displacement between sample 127 and sample 127 is determined. Assuming this displacement is 15, 15 is added to the total displacement at Block 215 to obtain $25+15=40$. The noisy bit flag is set. A check is then made as to whether $41-14<40<41+14$ at Block 210. Since it is, processing drops to Block 221. Since the noisy bit flag has been set, the test is made at Block 222 as to whether the amplitude of sample 125 is less than sample 127. The amplitude of sample 125 is obtained from the Raw Data Table and is seen to be 20. Similarly, the amplitude of sample 127 is 60. Accordingly, the test is whether $|X'20'-x'80'|<|x'60'-x'80'|$. Since the test fails, a '0' bit has not been found and the number of synchronization bits is reset to zero at Block 223. Since the noisy bit flag was set, the Peak Table pointer is decremented back to sample 125 and the process starts looking for a '0' bits again at sample 125.

Processing returns to Block 204. The pointer is moved to the next Peak Table entry i.e. address 126. The total displacement is set to be address 126 minus address 125 which is assumed for this example to be 5. This is clearly outside the window (Block 210) so that the Peak Table pointer is incremented twice (Block 212) to obtain the address of sample 130. Note that samples 128 and 129 are not contained in the Peak Table. A displacement between address 130 and address 126 is computed and added to the total displacement. The displacement between samples 130 and 126 is assumed to be 50, which when added to the total displacement, produces a result of 55. The noisy bit flag is set and then the computation is again made at Block as to whether this displacement is within the window. In other words, the computation is made whether $41-14<55<41+14$. Since the answer is yes, and the noisy bit flag has been set (Block 221), the amplitude test is performed at Block 220. The data value of sample 126 is compared to the value of sample 130; i.e. $|x'90'-x'80'|<|x'CO'-x'80'|$. Since this relationship is true, it is assumed that a synchronization bit has been found, and the number of synchronization bits is incremented at Block 27. Since the total displacement $D_z$ of 55 is larger than the preset displacement of 41, the displacement is incremented by 1 to obtain a displacement of 42.

The next Peak Table entry (i.e. sample 131) is pointed to at Block 204. The total displacement is set to be the difference between address 131 and address 130 which is assumed for this example to be 15. This clearly does not lie within the bit cell window, so the Peak Table pointer is incremented twice to address 133 and the displacement between address 133 and address 131, assumed to be 30, is added to the total displacement of 15 to obtain the total displacement of 45. The noisy bit flag is set and processing again returns to Block 210. A comparison is made whether the total displacement between sample 133 and sample 130 falls within the bit cell window. Since it does, the amplitude test is performed at Block 222. Since $|x'70'-x'80'|<|x'05'-x'80'|$, it is assumed that a second '0' bit is found, and the number of synchronization bits is set to two. Since this bit window is wider than the total displacement $D_z$, $D_z$ is incremented by 1 to 43.

Accordingly, two adjacent '0' synchronization bits have been found with the second '0' synchronization bit extending from peak 130 to peak 133 and the first synchronization bit extending from peak 125 to 130. Upon completion of processing, the Peak Table pointer is at sample 130 for purposes of creating the Bit Table.

DETAILED OPERATION—CREATE BITS TABLE

Figure 12A:
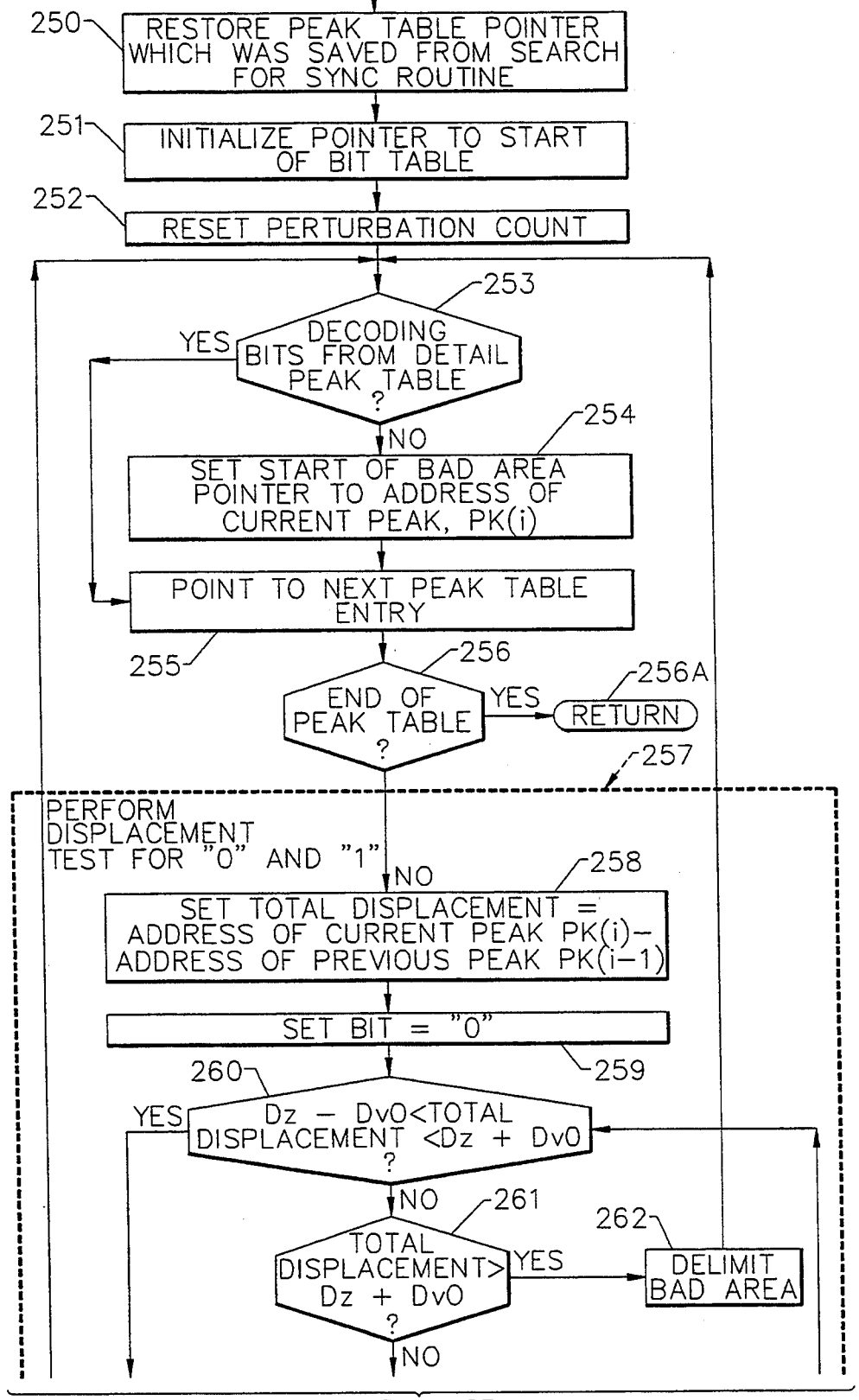
FIGS. 12A and 12B, which together form
Figure 12B:
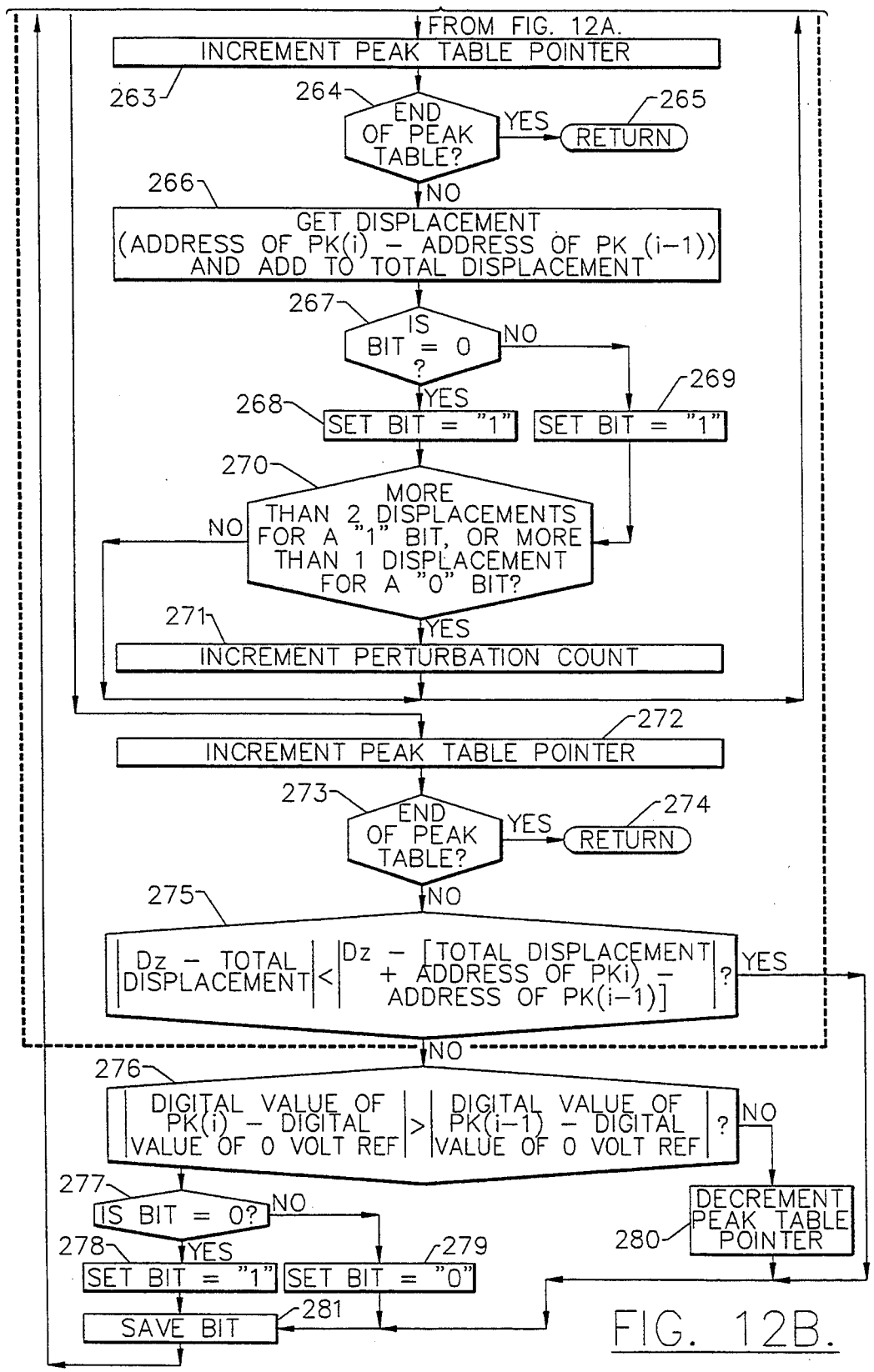

Referring now to FIG. 12, the detailed operation for creating the Bit Table (Block 56 of FIG. 7) will now be described. It will be recalled that displacement and amplitude tests were performed in the search for synchronization process of FIG. 10. In contrast with the search for synchronization process, during the creation of the Bit Table both '0' bit and '1' bits are being decoded. Accordingly, displacement and amplitude tests are performed for both '0' bits and '1' bits. The create Bit Table operation also includes an operation for de-limiting bad areas in the track. This delimiting of bad areas will be described in detail in FIG. 14. A specific example of the create Bits Table operation will follow this operational description.

Referring now to FIG. 12, the Peak Table pointer which was saved from the search for synchronization routine (FIG. 10, Block 203) is restored at Block 250. Then, a pointer is initialized to the start of the Bit Table at Block 251. The perturbation count is reset to zero at Block 252. Assuming that bits are not being decoded from the Detailed Peak Table (Block 253), then the start of bad area pointer is set to the address of the current peak, hereinafter referred to as PK(i), at Block 254.

Initializing the bad area pointer is done at this point because a bad area may or may not follow the current peak. The pointer is then moved to the PK(i+1) entry at Block 255. If the end of the Peak Table has been reached (Block 256) processing returns at Block 256A. Assuming the end of the Peak Table had not been reached, a displacement test for '0' bits and '1' bits is then performed at Block 257. This displacement test is similar to the displacement test for ('0') performed in connection with the search for synchronization except displacements for '1' bits are also performed.

The displacement test for '0' bits and '1' bits (Block 257) proceeds as follows: First, total displacement is set to the address of the current peak minus the address of the previous peak at Block 258, and 'bit' is set to zero at Block 259. A test is then made as to whether this total displacement is within the zero bit window i.e. to see if the total displacement is between the values $D_z-DVO$ and $D_z+DVO$. If yes, then the Peak Table pointer is incremented by one at Block 272. Assuming the end of the Peak Table has not been reached (Block 273), a test is made as to whether the magnitude of the zero bit window minus the total displacement is less than the magnitude of zero bit window minus the total displacement plus the displacement between the current peak and the previous peak. This test must be performed because it may be that the zero bit displacement may fall within the window, but a one bit displacement may fall closer within the window.

Assuming this test is not met, an amplitude test is made at Block 276 to determine whether the amplitude of the current peak is greater than the amplitude of the previous peak, to ensure that a '0' bit has truly been found. If the amplitude of the current peak is greater than the value of the previous peak, then it is assumed a '1' bit has been found and 'bit' is toggled at Blocks 277, 278, and 279, and this bit value is saved at Block 281. On the other hand, if the amplitude of the previous peak was greater than the amplitude of the present peak (as a result of the test at Block 276), then the Peak Table pointer is decremented at Block 280, in order to keep it on a bit boundary, and the bit is saved.

Still referring to FIG. 12, if the total displacement is not within the window (Block 260) then it is seen if the total displacement is greater than the maximum possible bit cell at Block 261. If this displacement is greater than the total maximum bit cell, this area is delimited as a bad area in Block 262. The details of delimiting a bad area will be described in connection with FIG. 14.

Returning again to Block 261, and assuming the total displacement is not greater than the maximum bit window, the Peak Table pointer is incremented by 1 at Block 263. Assuming that the Peak Table has not ended (Block 264), the displacement of the current address minus the previous address is obtained and added to the total displacement. The value of 'bit' is then toggled in Blocks 267, 268 and 269 and the perturbation count is incremented at Block 271 if there are more than two displacements for a '1' bit or more than one displacement for a '0' bit (Block 270). It will be recalled that this perturbation count is an indication that a noisy bit is found, i.e. the bit has been decoded properly but there has been a noise perturbation in the bit. The displacement test then continues at Block 260 for the new total displacement.

EXAMPLE—CREATE BIT TABLE

Figures 13A, 13B:
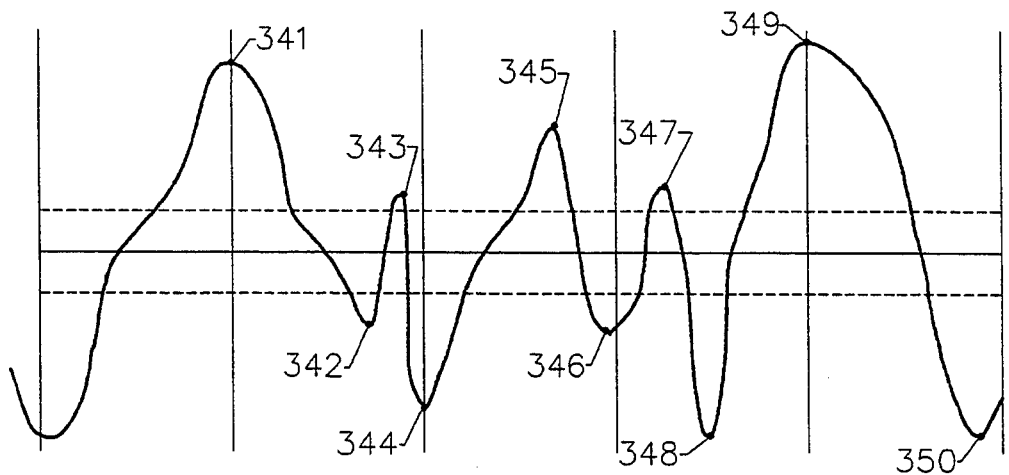
FIGS. 13A and 13B illustrate a sample waveform and table configurations for the operations of FIG. 12.

Referring now to FIG. 13, the "bit decode" operation for the waveform of FIG. 13A, based upon the Raw Data Table and Peak Table of FIG. 13B, will now be illustrated. For purposes of this example it will be assumed that the second '0' bit was found in the search for synchronization (FIG. 10), that $D_z$ at the end of search for synchronization is equal to 44, and that the end of the second '0' bit boundary is at location 341. Accordingly, bit decoding begins at location 341.

Bit detection begins at sample 341 as follows: The Peak Table pointer is incremented by '1' (Block 255) to point 342. The total displacement is set to the address of point 342 minus the address of point 341 which is assumed, for this example to be 25. 'Bit' is set to '0' (Block 259) and the test is made as to whether this total displacement is within the window i.e. is 44−14<25<44+14 (Block 260). Since the total displacement test is not met, the test is made at Block 261 to see if total displacement is greater than the maximum bit window of 58. Since this test is not met, the Peak Table pointer is incremented at Block 263 to refer to point 343. The displacement between point 343 and 342, assumed to be 15, is added to the total displacement of 25 to obtain a total of 40 (Block 266). Since bit equals '0' (Block 267), 'bit' is set to '1' (Block 268). Since more than two displacements have not been made for the '1' bit, the perturbation count is not incremented (Block 270).

Processing then returns to Block 260 where it is determined whether the new total displacement of 40 is within the window of 30 to 58 (Block 260).

A test is made whether the new displacement between points 343 and 341 is within the bit window. Since this displacement of 40 is within the bit window of 30 to 58 (Block 260), the Peak Table pointer is incremented by '1' and the test is made at Block 275 as to whether the magnitude of the bit cell minus the total displacement is less than the magnitude of the bit cell minus the total displacement plus the displacement between the current peak and the previous peak. In other words, the test is made as to whether $|x'44'-x'40'| < |'44'-(x'40'+(ADDR344-ADDR343)|$. Since the difference between address 344 and 343 is assumed to be 3, this reduces to whether 4<1 and the test fails.

Accordingly, the amplitude test of Block 276 is performed. This test is whether $|x'20'-x'80'| > |x'A0'-x'80'|$ or 60>20. Since it is, 'bit' is set to '0' and the bit is saved as a '0' bit. In other words, at the conclusion of this processing, it has been determined that from location 341 to location 344 a '0' bit has been found and that locations 342 and 343 are noise perturbations. The above processing shows that since the displacement for location 344 is closer to the bit cell width than the displacement for location 343, it is assumed that a '0' bit is present, and the 342-343 transition is a perturbation, rather than assuming that a '1' bit was present with a bit cell width from 341 to 343. This is because while 344 and 343 are within the window, 344 has a higher amplitude than 343.

Bit decoding at the bit window beginning at location 344 will now be described. At location 344, the pointer is incremented to the next Peak Table entry (345) at Block 255. The total displacement is set to be ADDR345−ADDR344 which is assumed to be a displacement of 31. 'Bit' is set to '0' at Block 259. Since the total displacement is within the bit displacement window (Block 260), the Peak Table pointer is incremented at Block 272 and the test is made at Block 275. This test is $|x`44'-x`31'| < |x`44'-(x`31'+(ADDR346-ADDR345))|$ The displacement between 346 and 345 is assumed to be 10 so that the test fails. Therefore the test is made at Block 276 as to whether the amplitude of 346 is greater than the amplitude of 345. This test is $|`60'-x`80'| > |x`C0'-x`80'|$. Since this test fails, the Peak Table pointer is decremented to peak 345 and the "Save Bit" routine is performed to save the bit as a '0'. Accordingly, it has been determined that the 344-345 transition is a '0' bit because even though the 345 and 346 locations both lie within the bit window tolerance, the amplitude of 345 is higher than that of 346. The new bit boundary is location 345.

Processing for the bit beginning at 345 proceeds as follows: The total displacement is set at Block 258 to be the difference between Block 346 and 345 which is assumed to be 10. At Block 259 'bit' is set to '0'. At Block 260, the check is made as to whether the total displacement is within the window. Since 10 is not within the window, the check is made at Block 261 as to whether 10 is greater than the maximum window, which it is not. Accordingly, the Peak Table pointer is incremented at Block 263 and the new displacement between 346 and 347, assumed to be 12, is added to the previous displacement of 10 in Block 266. Since 'bit' was equal to '0', 'bit' is set to '1' at Block 268. Processing again returns to Block 260 where the new displacement of 22 is compared with the window. It still does not fall within the window. It also is not greater than the maximum window (Block 261). Accordingly, the Peak Table pointer is incremented once again, at Block 263, to include the difference between address 348 minus 347 which is assumed to be 5. This is added to the total displacement at Block 266 to obtain 27. 'Bit' is set to '0' at Block 269. Also, since there is now more than one displacement for a '0' bit, the perturbation count is incremented at Block 271.

This total displacement is still not within the window (Block 260). Since it is also not beyond the maximum bit window (Block 261), the Peak Table pointer is incremented once again to include address 349 and this displacement is obtained and added to the total displacement. The total displacement now includes sample 349. At Block 266 it is assumed that the displacement between samples 349 and 348 is 13, so that the total displacement is now 27 plus 13 or 40, at Block 266. 'Bit' is now set to '1' at Block 268. Also, since there are now more than two displacements for a '1' bit, the perturbation count is incremented at Block 271. The test again is performed at Block 260.

Now, however, the total displacement of 40 is within the window of 30 to 58, so processing proceeds to Block 272. The Peak Table pointer is incremented to the next peak (350) and the test of Block 275 is performed. Here the test is $|x`44'-x`40'| < |x`44'-(x`40'+(ADDR350-"ADDR349))|$. Since this does satisfy the test, the Peak Table pointer is decremented to peak 349, and this bit is saved as a '1' in the Bit Table. Accordingly, it has been found that the transition between peak 345 to peak 349 is a '1' transition with the 346 to 347 transition being a noise perturbation. Accordingly, the Bit Table of FIG. 13B now contains a '0', '0', and '1' therein.

DETAILED OPERATION—DELIMIT BAD AREA

Figure 14:
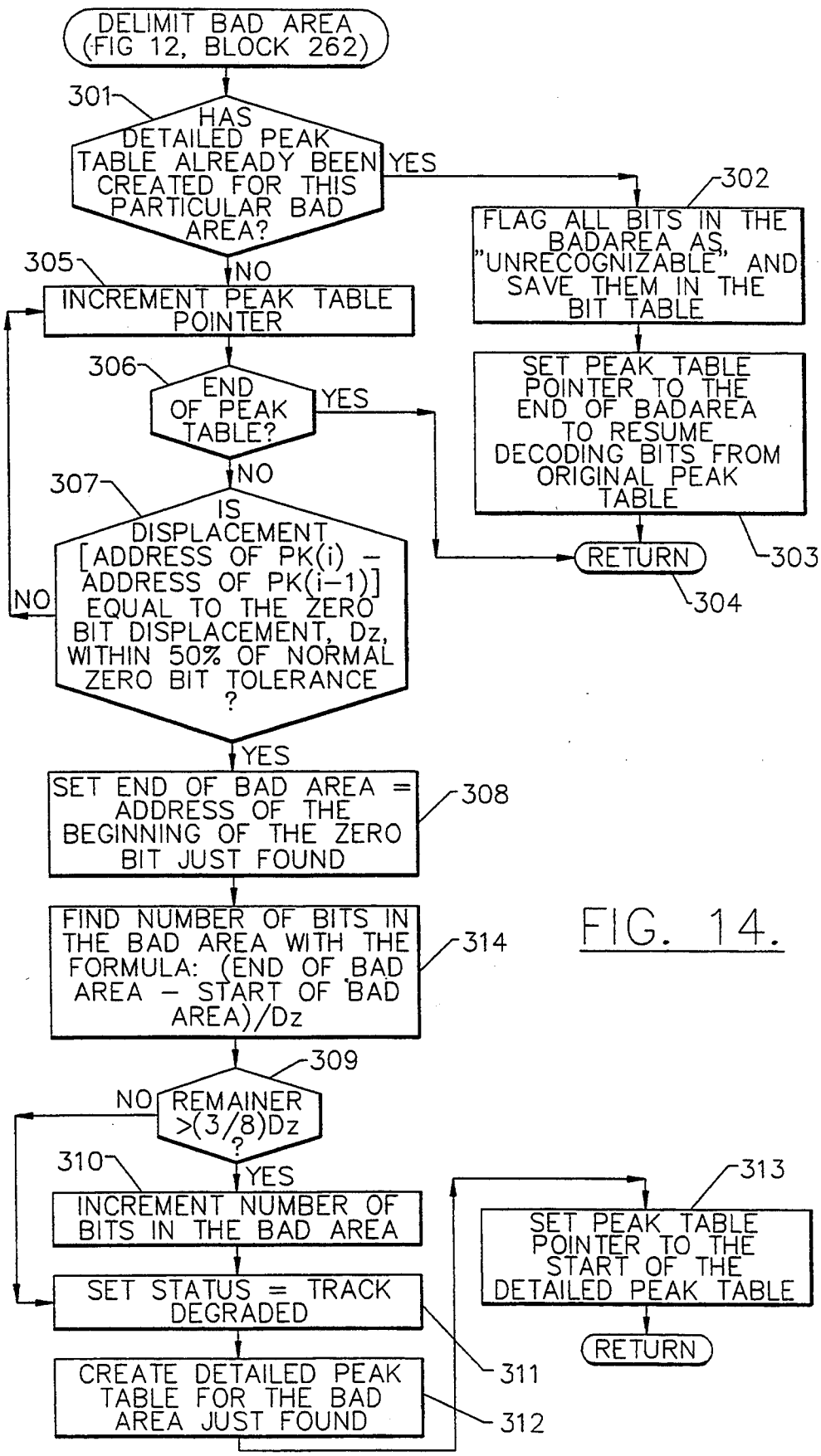
FIG. 14 illustrates the operations for delimiting a bad area, according to the present invention.

Referring now to FIG. 14, the operations performed to delimit the bad areas of data, generally described in FIG. 12, Block 262, will now be described. It will be recalled from FIG. 12 that a bad area is delimited when the total displacement between adjacent peaks is greater than the maximum length of the bit cell, i.e. greater than $D_z + D_y O$. The bad area is delimited, using the operations of FIG. 14, in an attempt to regain synchronization at the end of the bad area. In order to regain synchronization the number of bit cells in the bad area are found and then bit determination continues at the end of the bad area. A Detailed Peak Table is created for the bad area in an attempt to find the peaks in the bad area.

More particularly, referring to FIG. 14, if a Detailed Peak Table has already been created for this particular bad area (Block 301), all bits in the bad area are flagged as "unrecognizable" and saved in the Bit Table, at Block 302. The Peak Table pointer is then set to the end of the bad area to resume decoding the bits from the original Peak Table at Block 303, and processing returns at Block 304.

On the other hand, if a Detailed Peak Table has not yet been created, the Peak Table pointer is incremented at Block 305. Assuming the end of the Peak Table has not been reached (Block 306), a test is made as to whether the displacement address of the current peak minus the previous peak is equal to the '0' bit displacement, $D_z$, with a much narrower tolerance, for example 50% of the normal '0' bit tolerance. This is done to ensure that good data begins at the end of the bad area. If the test fails, the Peak Table pointer is incremented again (Block 305) and the test is performed again until a displacement which is equal to the '0' bit displacement with a narrower tolerance is found. Once such a narrow tolerance bit displacement is found, the end of the bad area is set to the address of the beginning of the '0' bit just found at Block 308. Then, the number of bits in the bad area are found using the formula "end of bad area minus start of bad area divided by $D_z$" at Block 314.

The processing at Block 309 deals with any remainder found. It has been empirically found, according to the invention, that any remainder larger than 3/8 the '0' width means that another bit should be included in the bad area because of the "bit spreading" phenomena which takes place adjacent to the bad area. However, it will be understood by those having skill in the art that other remainders may be used. Accordingly, if the remainder is greater than 3/8 $D_z$, the number of bits in the bad area is incremented by '1' at Block 310. A degraded track status message is flagged at Block 311. Then, a Detailed Peak Table is created for the bad area just found at Block 312. Details of how the Detailed Peak Table is created will be described in connection with FIG. 15 below. After the Detailed Peak Table is created, the Peak Table pointer is set to the start of the Detailed Peak Table at Block 13, and processing returns to Block 253 of FIG. 12.

DETAILED OPERATION—CREATE DETAILED PEAK TABLE

Figure 15:
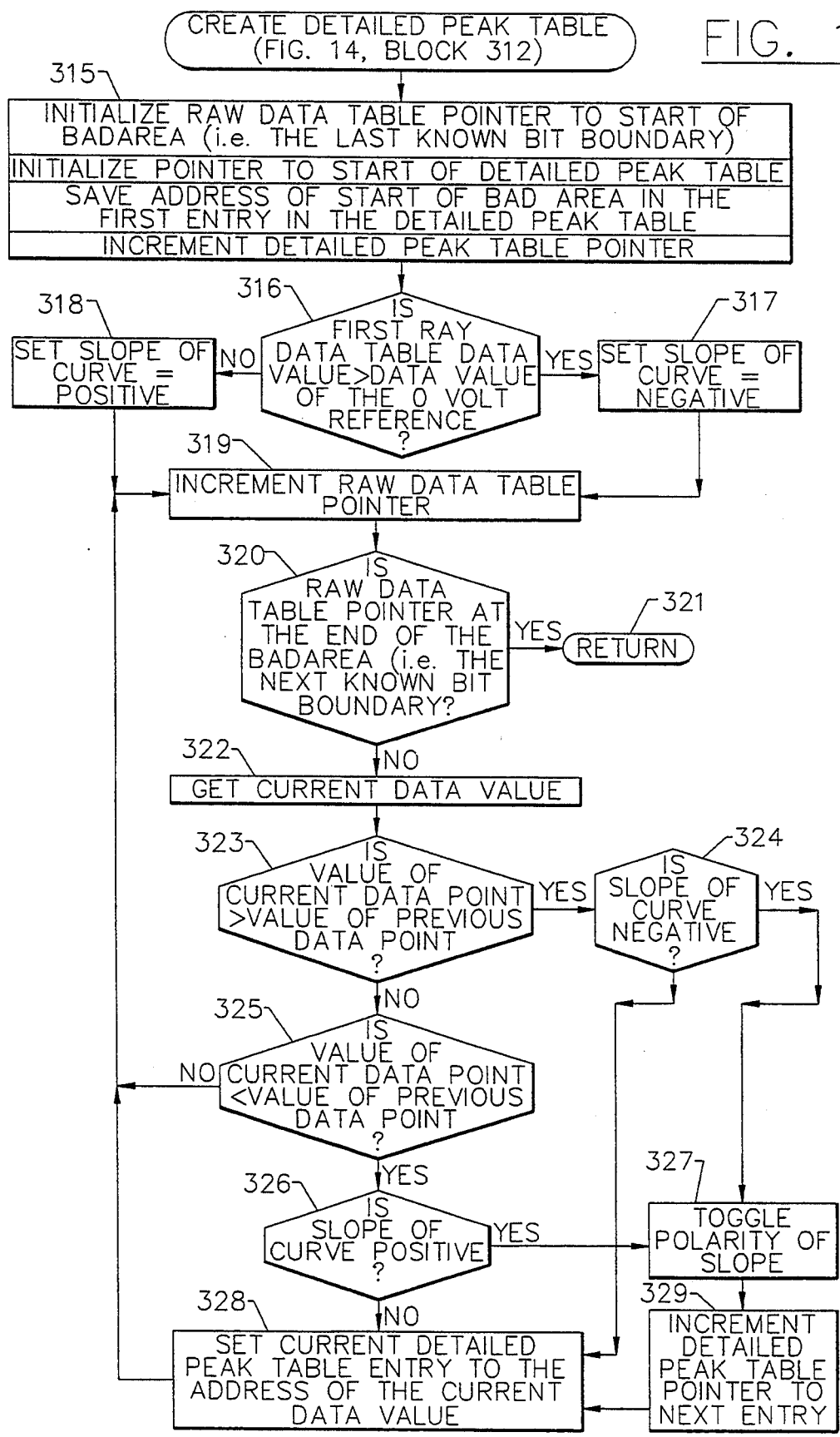
FIG. 15 illustrates the operations for creating a detailed peak table, according to the present invention.

Referring now to FIG. 15, the detailed operation for creating a Detailed Peak Table (FIG. 14, Block 312) will now be described. In general, this operation increments through the Raw Data Table without regard for a threshold or guard band, and detects every peak by looking at the slope of the curve and the data values.

In particular, processing proceeds at Block 315 by initializing the Raw Data Table pointer to the start of the bad area, initializing a pointer to the start of the Detailed Peak Table and saving the address of the start of the bad area as the first entry in the Detailed Peak Table. The Detailed Peak Table pointer is then incremented. At Block 316 a test is made as to whether a first Raw Data Table value is above the zero volt reference. If it is, then the slope is initially set negative in Block 317. If it is not, the slope is initially set positive at Block 318.

The Raw Data Table pointer is then incremented to the next raw data point at Block 319, and a check is made to ensure that the end of the bad area has not been reached to Block 320. The current data value is then obtained at Block 322, and a comparison is made as to whether the value of the current data point is greater than the value of the previous data point (Block 323). If the value is greater than the previous point, then a positive slope is assumed. If the slope of the curve is negative (Block 324), it is toggled at Block 327 to produce a positive slope and the Detailed Peak Table is incremented to the next entry. On the other hand, if the value of the current data point is less than the previous data point (Block 325), a test is made to determine whether the slope of the curve is positive (Block 326), and the current Detailed Peak Table entry is set to the address of the current data value at Block 328. The Raw Data Table is then incremented again.

By repeatedly checking the magnitude of the slope every peak in the bad data area is identified in the Detailed Peak Table, regardless of whether it is outside the guard band. Once all the peaks have been identified, processing continues to attempt to identify bits in the Detailed Peak Table using the algorithm previously described.

EXAMPLE—CREATE DETAILED PEAK TABLE

Figure 16:
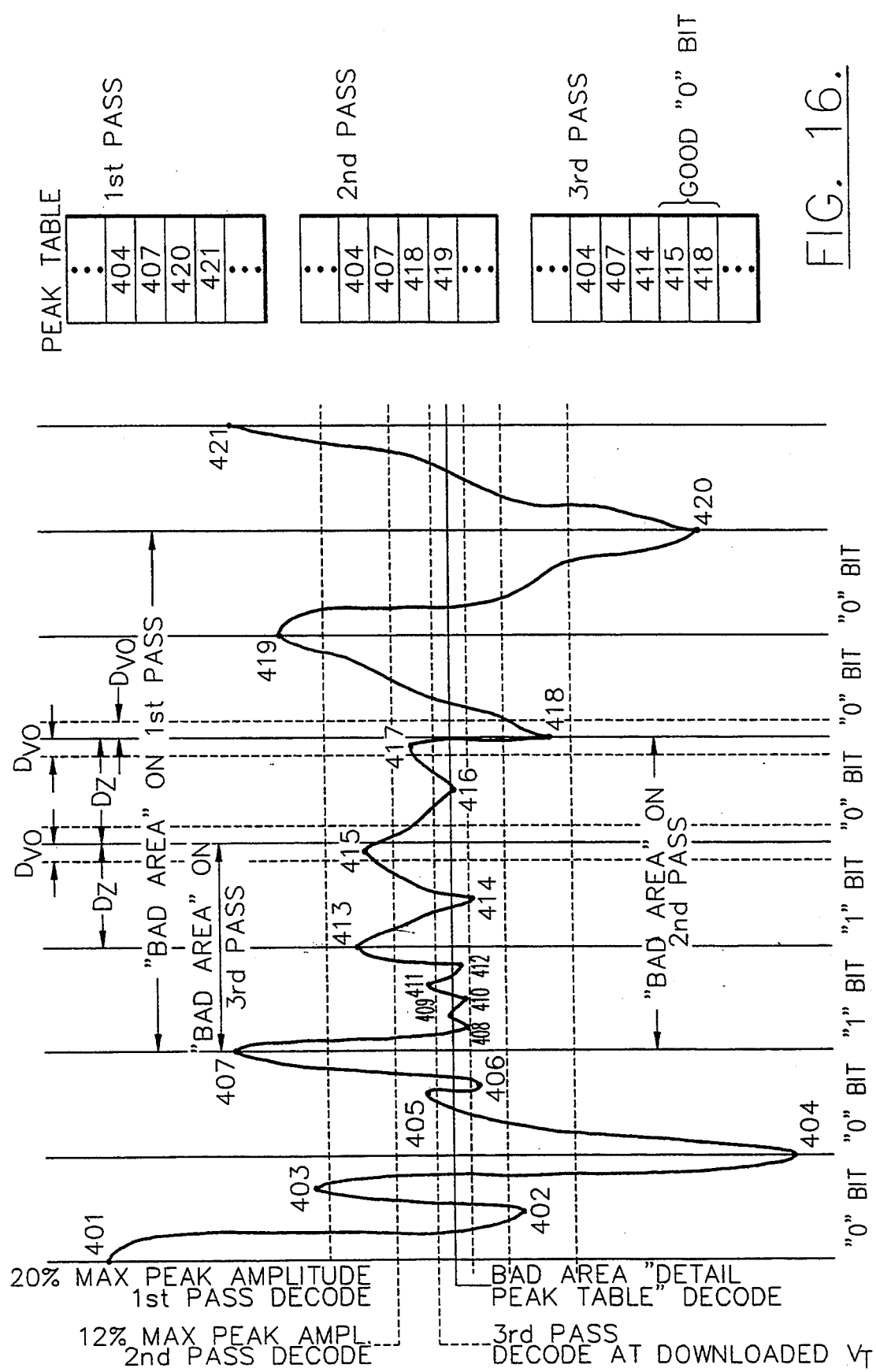
FIG. 16 illustrates a sample waveform for the operation of FIG. 15.

Referring now to FIG. 16, creation of the Detailed Peak Table is illustrated. As shown in FIG. 16, in the first pass, the bad area between peaks 407 and 420 is used to create a Detailed Peak Table. After the processing of FIG. 15, the Detailed Peak Table will contain the address of locations 407–420, but will not include any of the intermediate locations which are not peaks. As shown in FIG. 16, no threshold is employed for calculating peaks.

DETAILED OPERATION—SAVE BIT

Figure 17:
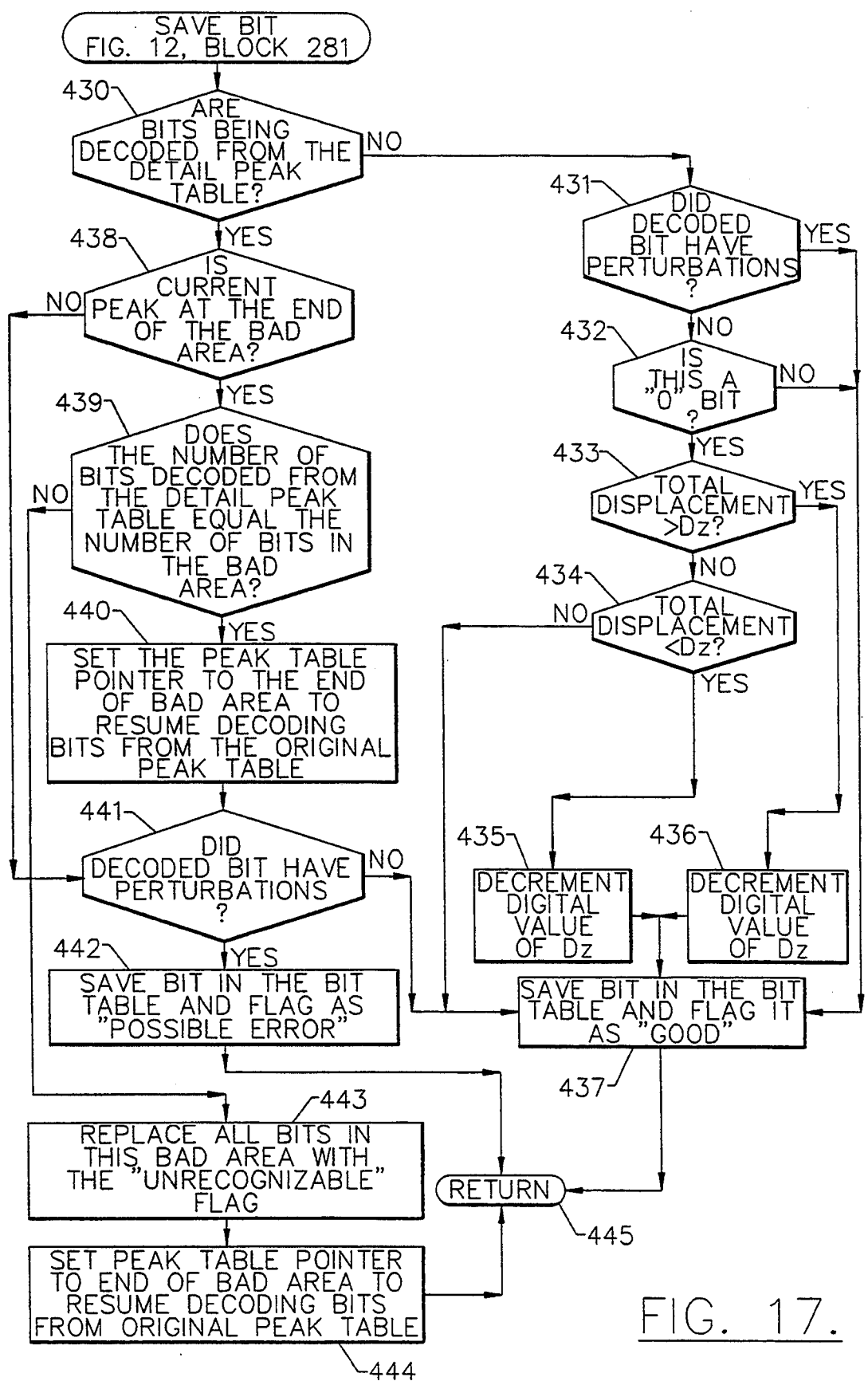
FIG. 17 illustrates operations for saving a bit, according to the present invention.

Referring now to FIG. 17, the detailed operation for saving a bit which has been decoded using the Peak Table or Detailed Peak Table, pursuant to the operation of FIG. 12, will now be described. It will be recalled that the "save bit" operation at Block 281 is the final operation in FIG. 12 after a bit has been decoded. The "save bit" operation increments or decrements the bit window size based on the bit window of the decoded bit. According to the present invention, the bit window size is incremented by '1' if the total displacement of the current bit is greater than the current bit window and is decremented by one of the total displacement is less than the current bit window. The "save bit" operation also ensures that if the bits were decoded from the Detailed Peak Table, the number of decoded bits equals the number of bits in the bad area. If this is not the case then all the bits in the bad area are replaced with an "unrecognizable" flag even though they have been decoded.

More specifically, referring to FIG. 17, a determination is first made, at Block 430, as to whether bits are being decoded from the Detailed Peak Table. If the bits are not being decoded from the Detailed Peak Table, meaning that they are being decoded from the Peak Table, then a test is made at Block 431 as to whether the decoded bit had perturbations. If it had perturbations, no further processing is performed. The bit is saved in the Bit Table and flagged as a good bit at Block 437.

On the other hand, if the decoded bit did not have perturbations, the bit window will be adjusted according to the present invention. Accordingly, at Block 432, a test is first made as to whether the decoded bit is a '0' bit. According to the present invention, the bit window size is not adjusted for a '1' bit, but is only adjusted for a '0' bit without perturbations. Accordingly, if at Block 432 a '0' bit was decoded, then a test is made at Block 433 as to whether the total displacement of the decoded bit is greater than the current value of $D_z$. If this is the case, at Block 436, the digital value of $D_z$ is incremented by a predetermined amount, such as '1', at Block 436. On the other hand, if the total displacement is less than $D_z$ (Block 434), then the digital value of $D_z$ is decremented by a predetermined value such as '1' at Block 435. After the bit window $D_z$ has been adjusted, the bit is saved in the Bit Table and flagged as "good" at Block 437.

Returning again to the operation of Block 430, if the bits are being decoded from the Detailed Peak Table, a test is made, at Block 438, as to whether the current peak is at the end of the bad area. If this is not the case, then a test is made at Block 441 as to whether the decoded bits had perturbations. If there were no perturbations, the bit is saved in the Bit Table and flagged as "good" in Block 437. On the other hand, if there were perturbations, then the bit is saved at Block 442, but it is flagged as having a "possible error". Processing then continues at Block 445.

Returning again to Block 438, if the current peak is at the end of the bad area, a test is made at Block 439 as to whether the number of bits decoded from the Detailed Peak Table is equal to the number of bits computed for the bad area. If this is not the case, then all the bits in the bad area are replaced with an unrecognizable flag, at Block 43, even though they initially appeared to be decoded properly. If the number of bits decoded does not equal the number of bits in the bad area, it is apparent that synchronization has been irretrievably lost and that any decoded bits cannot be treated as good bits. Accordingly, the Peak Table is set to the end of the bad area at Block 444 and decoding of bits is resumed from the original Peak Table.

On the other hand, if the number of bits decoded from the Peak Table is equal to the number of bits in the bad area (Block 439), then the Peak Table pointer is reset to the end of the bad area so that decoding can resume from the original Peak Table at Block 440. Assuming the decoded bit did not have any perturbations (Block 441), it is saved in the Bit Table and flagged as "good". If it did have perturbations, then at Block 442 it is saved in the Bit Table but is flagged as having a "possible error". Accordingly, at the end of the "save bit" processing, every bit will be flagged as either "good", "unrecognizable" or as a "possible error".

DETAILED OPERATION—CONVERT BITS TO BYTES

Figure 18A:
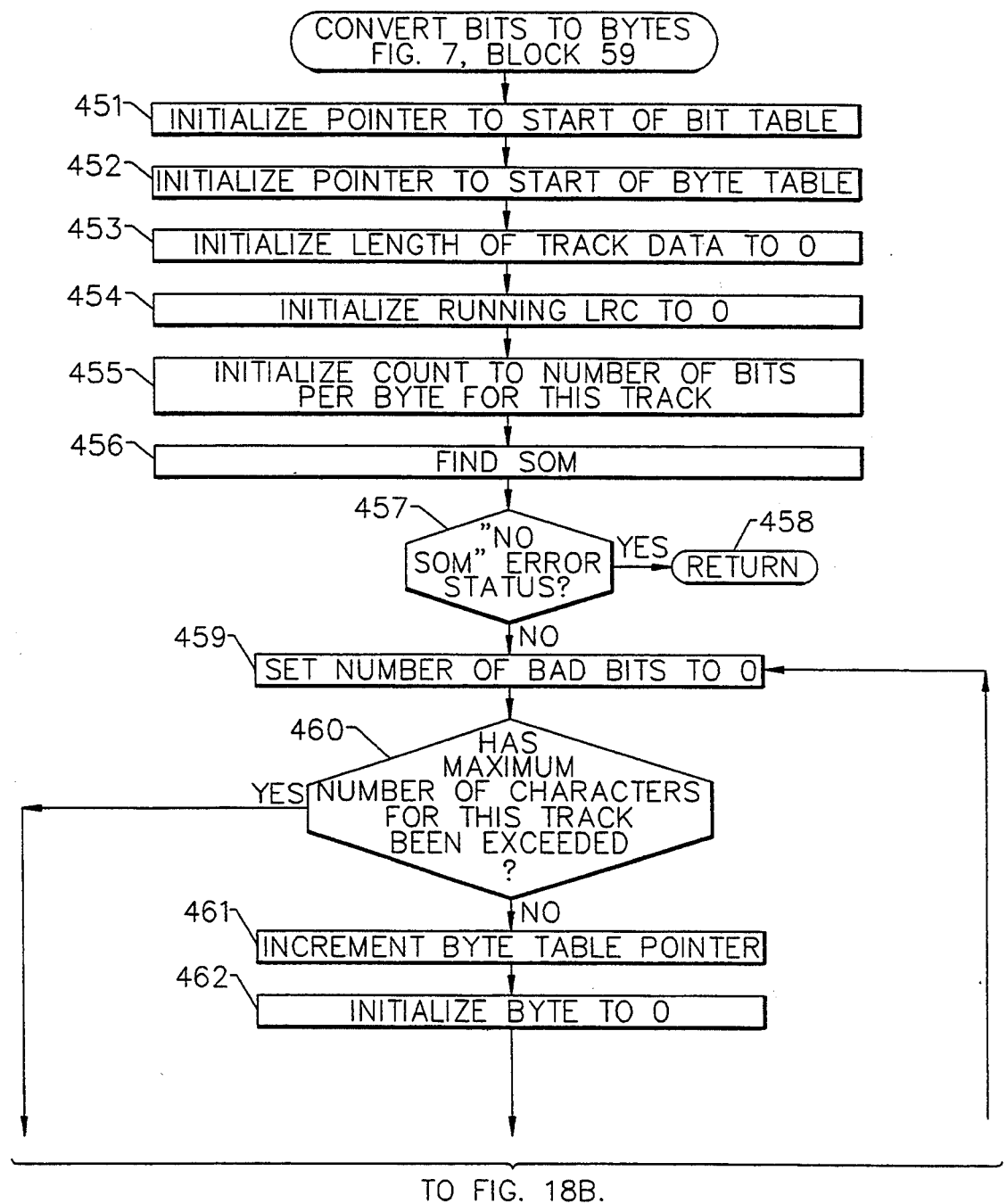
FIGS. 18A–18C, which together form
Figure 18B:
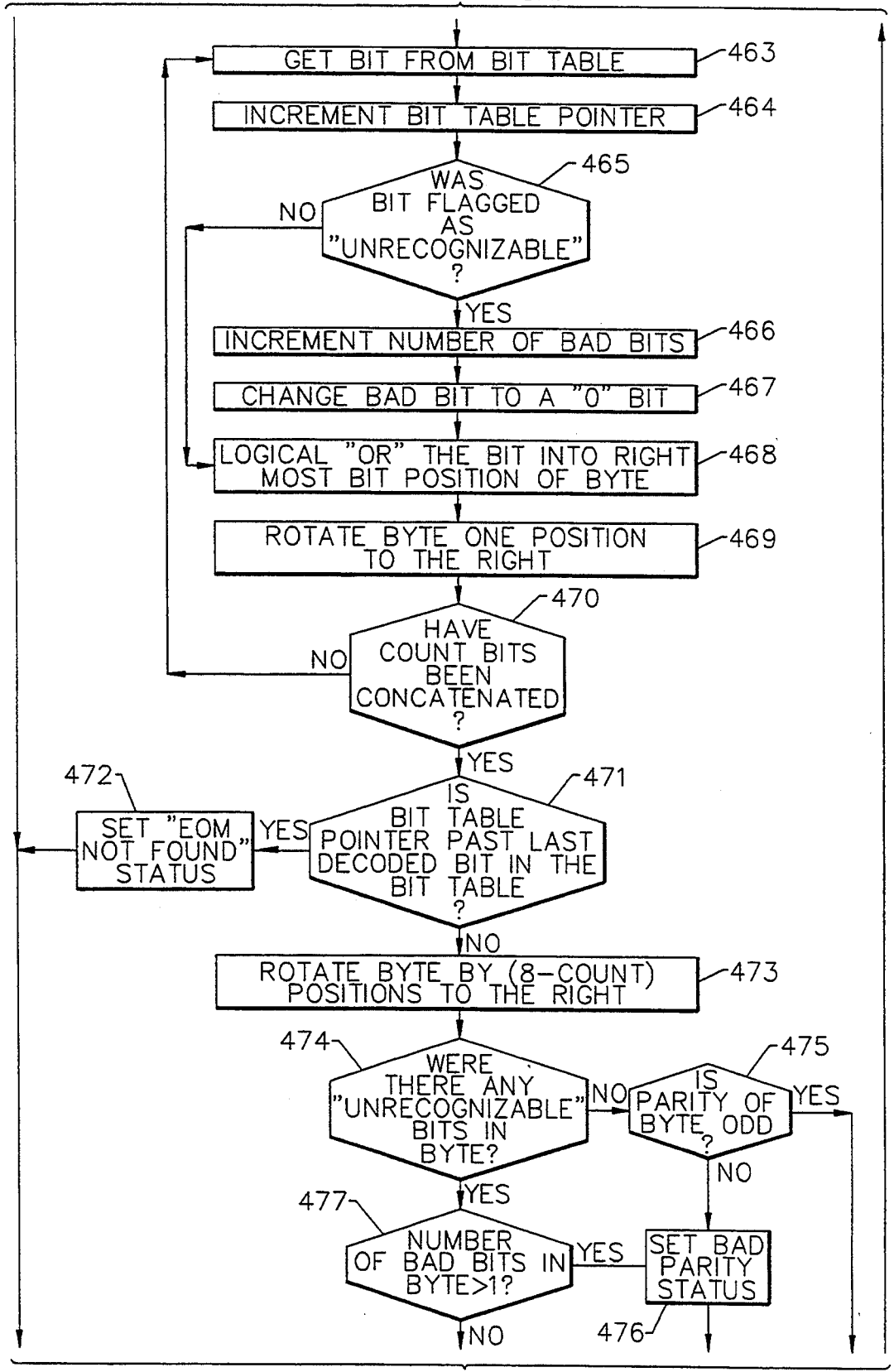
Figure 18C:
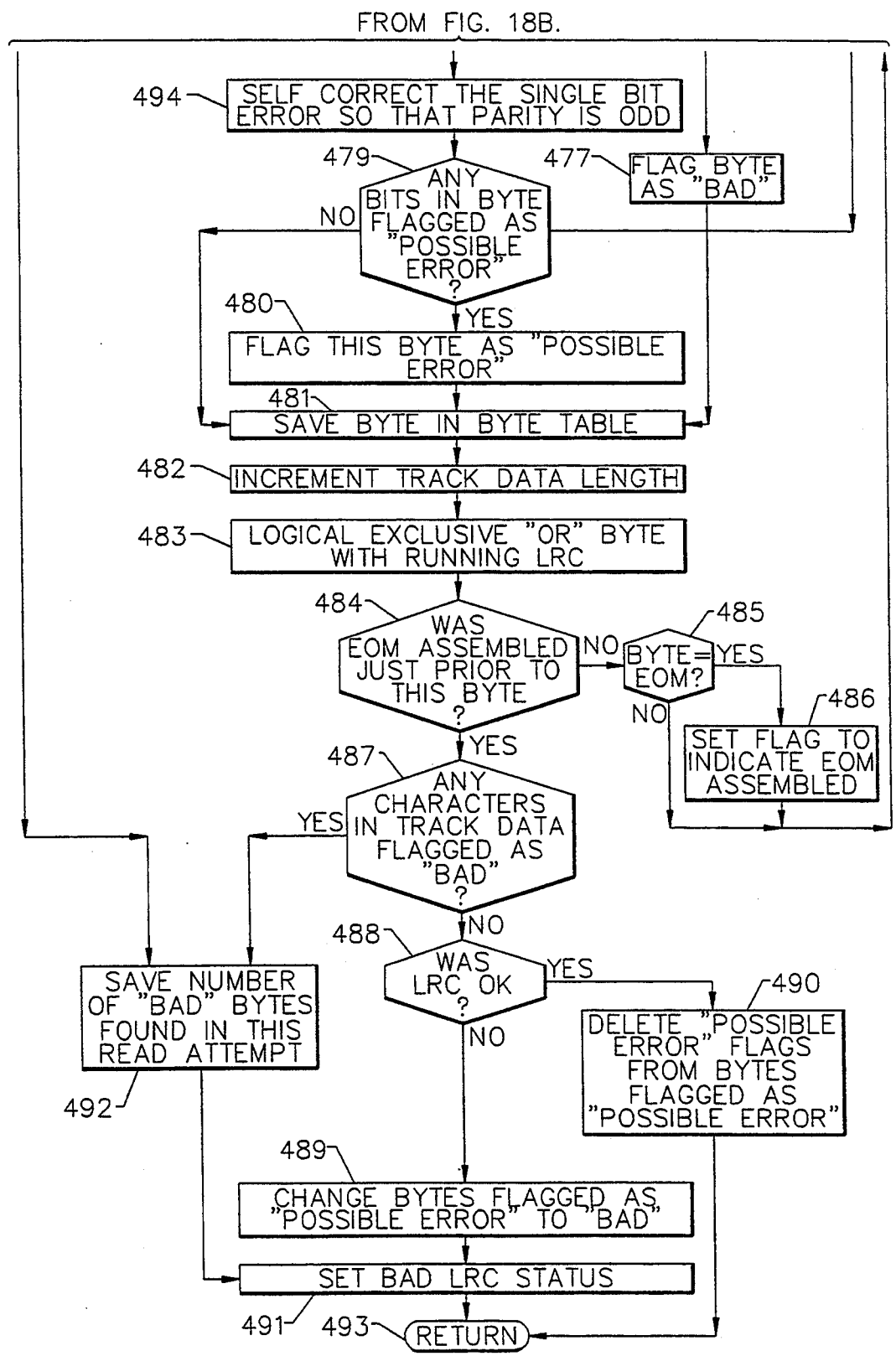

Referring now to FIG. 18, the detailed operation to convert the bits from the Bit Table into bytes, pursuant to Block 59 of FIG. 7, will now be described. For purposes of this operation, it is assumed that all bits have been flagged either "good", "possible error", or "unrecognizable" as a result of the create bits table operation (Block 56 of FIG. 7). The "Convert Bits to Bytes operation" described in connection with FIG. 18, uses parity and LRC (Longitudinal Redundancy Check) to correct "possible error" or some or all of the "unrecognizable" bits. This sharply contrasts with prior art use of parity or LRC, which merely flagged the bits as having an error but did not employ any self-correcting capabilities for "possible error" or "unrecognizable" bits.

Referring now to FIG. 18, operations begin by pointing to the start of the Bit Table, pointing to the start of the Byte Table, initializing the length of track data to '0' and initializing the running LRC to '0' (Blocks 451–454 respectively). The "count" variable is initialized to the number of bits per byte for the particular track being read.

Processing begins to find the "start of message" (SOM) character which recognizes the beginning of the data field and the end of the synchronization field. The detailed processing for finding SOM will be described in connection with FIG. 19 below. Assuming that the SOM character cannot be found (Block 457), then processing returns at Block 458. On the other hand, if the SOM has been found, then the number of bad bits is set to zero at Block 459 and, assuming the maximum number of characters for this track has not been exceeded (Block 460) the bits are converted into bytes.

Bits are converted into bytes by incrementing the Byte Table pointer (Block 461), initializing the byte to '0' (Block 462), obtaining a bit from the Bit Table (Block 463), incrementing the Bit Table pointer (Block 464), and testing the bit to see if it was flagged as "unrecognizable" (Block 465). If the bit was flagged as "unrecognizable", then the number of bad bits is incremented (Block 466) and for error correction purposes it is assumed that the bad bit is a '0' bit (Block 467). Then the bit is placed in the right most position of the byte (Block 468) and the byte is rotated one position to the right (Block 469). Then, assuming that "count" bits have not been concatenated (Block 470), which indicates that further bits are to be decoded, the next bit is obtained from the Bit Table (Block 463), and the same processing is performed. Accordingly, bits are stored in the proper sequence with padded leading '0' bits until a byte (which contains five bits for Tracks 2 and 3 and seven bits for Track 1) has been formed.

Assuming that the Bit Table pointer is not beyond the last decoded bit in the Bit Table (Block 471), the byte positions are rotated to the right at Block 473 and a test is made at Block 474 as to whether there were any "unrecognizable" bits in the byte. If there were no "unrecognizable bits" in the byte, then a test is made as to whether parity is good (Block 475). If not, then bad parity status is set and the byte is flagged as bad (Block 476 and 477 respectively).

Returning to Block 474, if there were unrecognizable bits in the byte, a test is made at Block 478 as to whether there was more than one bad bit in the byte. If there was more than one bad bit, then parity status is set to bad (Block 476) and the byte is flagged as bad. However, according to the present invention, if the number of bad bits is not greater than '1', then the single bit error is self corrected at Block 494 so that parity is again odd. A test is then made at Block 479 as to whether any bits in the byte are flagged as having a "possible error". If this is the case, then the byte is flagged as having a possible error at Block 480 for a test with the LRC character. The byte is then saved in the Byte Table. The track data length is incremented at Block 482 and the LRC character is formed by logical exclusive ORing the byte with the running LRC at Block 483. At Block 484, a test is made as to whether the "end of message" character has already been assembled. If not, a test is made at Block 485 as to whether this is the "end of message" character. If it is not the "end of message", processing continues to assemble the next byte. If it is the "end of message", a flag is set to indicate that the "end of message" character has been assembled at Block 86.

Processing then continues as described above until the "LRC" character is assembled. A test is then made as to whether any characters in the track were flagged as "bad" at Block 487. If there were no bad characters flagged, then the LRC check is performed at Block 488. Assuming the LRC is valid, at Block 490 all possible error flags are deleted from the bytes which were flagged to have a possible error and the data is all considered "good". On the other hand, assuming the LRC check is not valid, at Block 489 those bytes flagged as "possible error" are changed to "bad" and the bad LRC status is changed at Block 491. On the other hand, if any characters in the track data were flagged as bad, then at Block 492 the number of bad bytes found in this read attempt is saved using the processing of FIG. 7. Bad LRC status is set at Block 491 and processing returns at Block 493.

DETAILED OPERATION—FIND SOM

Figure 19A:
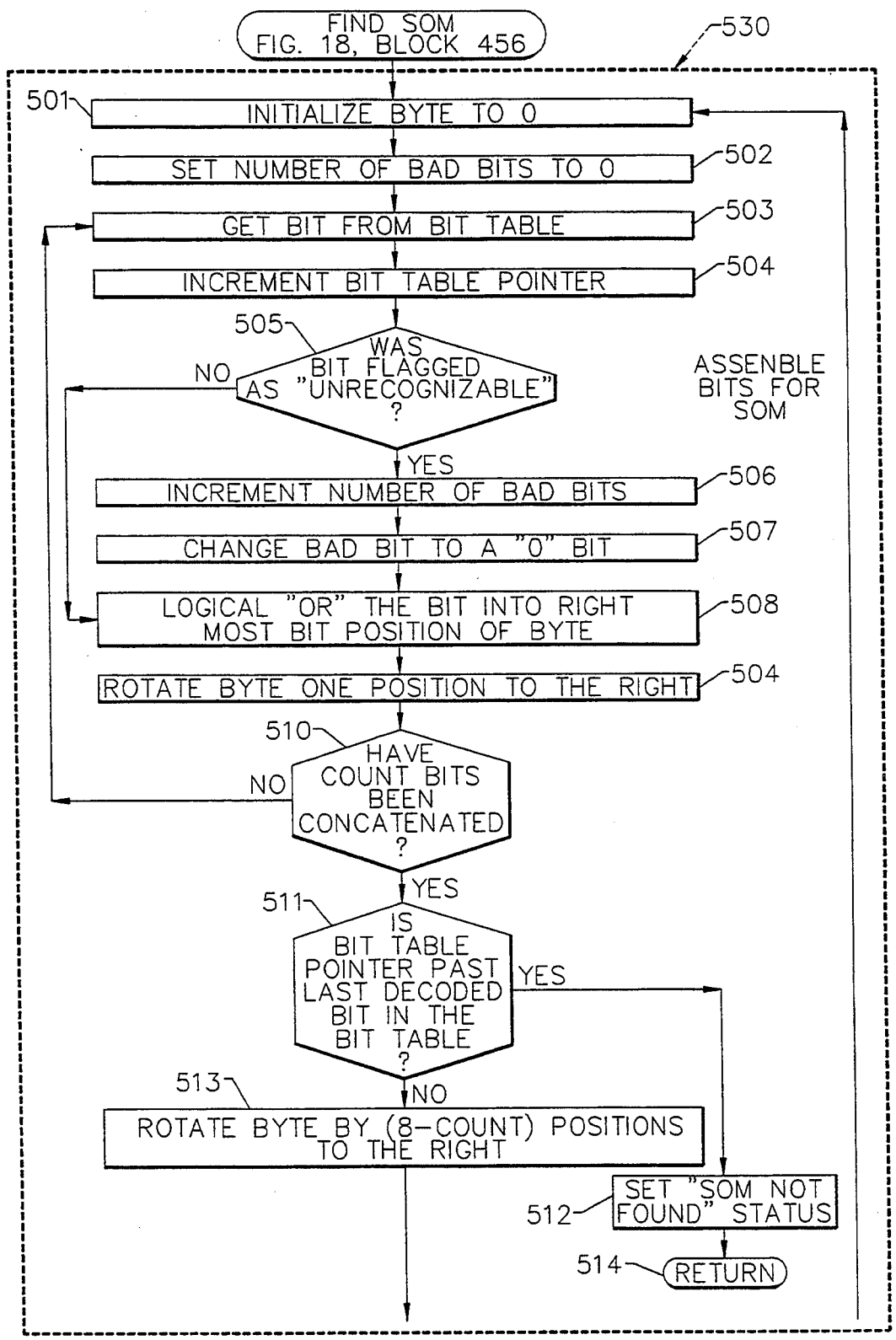
FIGS. 19A and 19B, which together form
Figure 19B:
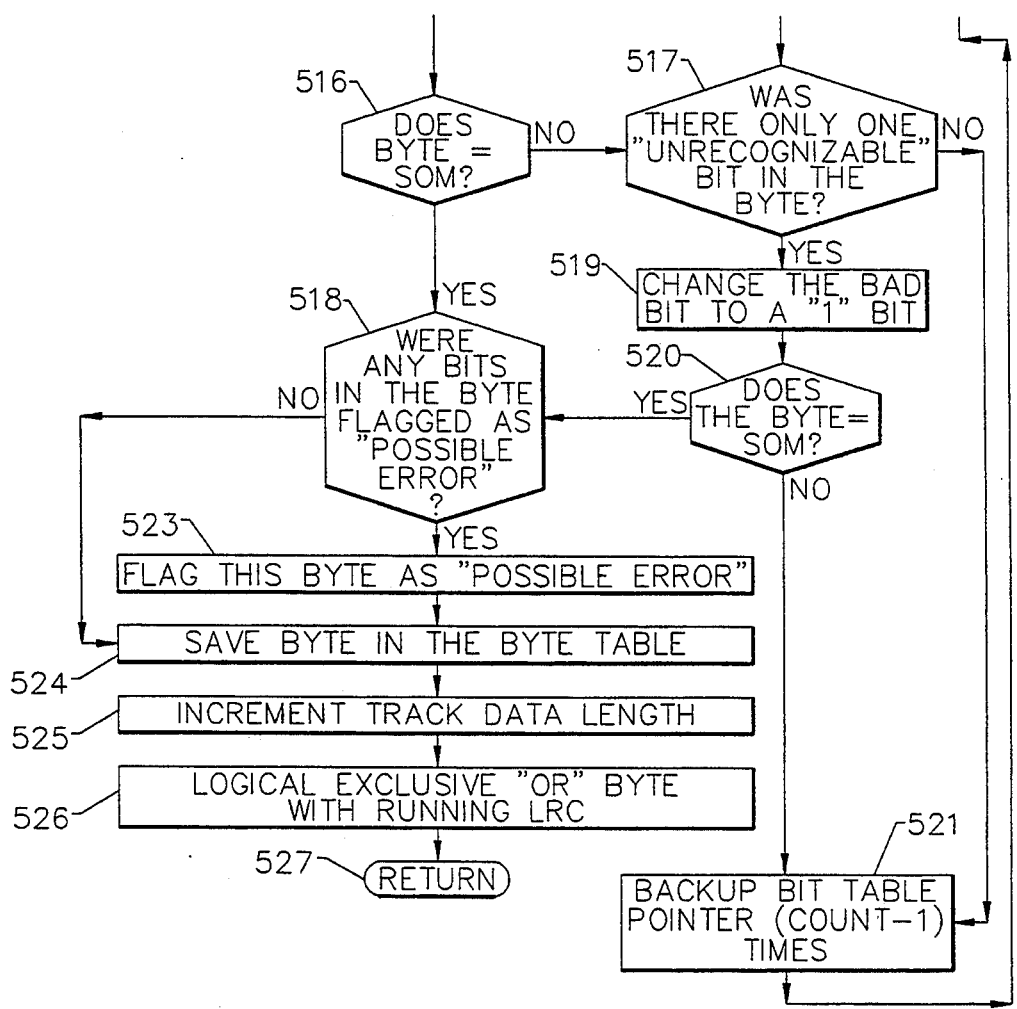

Referring now to FIG. 19, the detailed operations for finding the Start of Message (SOM) character (FIG. 18, Block 456) will now be described. The processing for finding the SOM character places the decoding operation into byte synchronization. In other words, this processing tests all leading '0' bits until the SOM character is found. Once the SOM is found, byte synchronization is established and bytes are built from the decoded bits using the "convert bits to bytes" operation of FIG. 18.

Referring now to FIG. 19, the SOM is found by first assembling the proper number of bits for the SOM, treating the unrecognizable bits as 0's and keeping account of the unrecognizable bits, at Block 530. In particular, a byte register is initialized to '0' (Block 501) and the number of bad bits is set to '0' (Block 502). One bit is obtained from the Bit Table at Block 503 and the Bit Table pointer is incremented at Block 504. A test is made, at Block 505 as to whether the bit was flagged as "unrecognizable". If yes, then the "bad bit" counter is incremented at Block 506 and the bad bit is treated as a '0' bit at Block 507 for possible error correction later.

On the other hand, if the bit was not flagged as "unrecognizable" in Block 505, the bit is logically ORed into the right most bit position at Block 508 and the byte is rotated one position to the right at Block 509. Assuming the count bits have not been concatenated (Block 510), then bits continue to be obtained until the number of bits equals the count. It will be understood by those having skill in the art that the number of bits for SOM may vary for example between five and seven for tracks T2, T3 and T1 respectively.

Once the proper number of bits for an SOM have been obtained at Block 510, a test is made as to whether the Bit Table pointer is past the last decoded bit in the Bit Table (Block 511). If this is the case, the SOM cannot be found and the status is so set at Block 512, and processing returns at Block 514. On the other hand, if this is not the case, the byte is rotated 8 minus "count" positions to the right at Block 513 to pad the left most positions with '0' bits. A proper byte has now been assembled and may be tested for equality to the SOM character.

Referring to Block 516 a test is made as to whether byte is equal to the SOM character. If not, then a test is made as to whether there is only one unrecognizable bit in the byte (Block 517), and if this is the case then the bad bit is changed to a '1' bit at Block 519 and the test again is made as to whether the byte equals the SOM character (Block 520). If it still does not, the Bit Table pointer is backed up "count" minus one times, and a new character is assembled at Block 530. On the other hand, if the tests of Blocks 516 or 520 indicate that the byte equals SOM, a test is made at Block 518 as to whether any bits were flagged as having a "possible error". If yes, this byte is flagged as having a possible error and is saved in the byte table. The track data length is incremented, at Block 525, because the SOM has been found, and the SOM is logical EXCLUSIVE-OR'ed with the running LRC. Processing then returns at Block 527, because byte synchronization has been obtained.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A system for decoding a data signal encoded on a data signal media, comprising:
   means for reading said data signal on said data signal media;
   means, responsive to said reading means, for decoding the data signal on said data signal media;
   means, responsive to said decoding means, for determining that said data signal is degraded notwithstanding that said decoding means decoded the data signal free of errors; and
   means, responsive to said determining means, for producing a degraded data signal indication;
   wherein said data signal media comprises magnetic data signal media;
   wherein said determining means comprises means for determining that excess magnetic flux transitions are present on said magnetic data signal media;
   wherein said data signal comprises a two-frequency data signal encoded on said magnetic data signal media as a plurality of bit cells, with a first data value being represented by a bit cell having no intermediate flux transition therein, and a second data value being represented by a bit cell having one flux transition therein; and
   wherein said determining means comprises means for determining that more than one flux transition occurred in a bit cell having said second data value represented therein.

2. The system of claim 1 wherein said determining means further comprises means for determining that more than one flux transition outside a predetermined guard band occurred in a bit cell having said second data value represented therein.

3. The system of claim 1 wherein said determining means further comprises means for determining that more than one flux transition occurred in a predetermined number of bit cells having said second data value represented therein.

4. The system of claim 1 further comprising a host computer and wherein said degraded signal producing means is connected to said hist computer.

5. The system of claim 4 wherein said host computer comprises means for initiating replacement of said data signal media in response to receipt of said degraded signal indication.

6. A system for decoding a data signal encoded on a data signal media, comprising:
   means for reading said data signal on said data signal media;
   means, responsive to said reading means, for decoding the data signal on said data signal media;
   means, responsive to said decoding means, for determining that said data signal is degraded notwithstanding that said decoding means decoded the data signal free of errors; and
   means, responsive to said determining means, for producing a degraded data signal indication;
   wherein said data signal media comprises magnetic data signal media;
   wherein said determining means comprises means for determining that excess magnetic flux transitions are present on said magnetic data signal media;
   wherein said data signal comprises a two-frequency data signal encoded on said magnetic data signal media as a plurality of bit cells, with a first data value being represented by a bit cell having no intermediate flux transiion therein, and a second data value being represented by a bit cell having one flux transition therein; and
   wherein said determining means comprises means for determining that at least one flux transition occurred in a bit cell having said first data value represented therein.

7. The system of claim 6 wherein said determining means further comicrises means for determining that at least one flux transition outside a predetermined guard band occurred in a bit cell having said first data value represented therein.

8. The system of claim 6 wherein said determining means further comprises means for determining that at least one flux transition occurred in a predetermined number of bit cells having said first data value represented therein.

9. A system for decoding a data signal encoded on a data signal media, comprising:
   means for reading said data signal on said data signal media;
   means, responsive to said reading means, for decoding the data signal on said data signal media;
   means, responsive to said decoding means, for determining that said data signal is degraded notwithstanding that said decoding means decoded the data signal free of errors; and
   means, responsive to said determining means, for producing a degraded data signal indication;

wherein said data signal comprises a two-frequency data signal, encoded as a plurality of bit cells, with a first data value being represented by a bit cell having a signal of a first frequency therein, and a second data value being represented by a bit cell having a second frequency which is twice said first frequency therein; and wherein said decoding means comprises:

means for obtaining samples of said two-frequency data signal;

means, connected to said sample obtaining means, for converting obtained samples of said two-frequency data signal into digital values; and means connected to said converting means, for manipulating the digital values, to thereby decode said two-frequency data signal.

10. The apparatus of claim 9 wherein said manipulating means comprises:

means for decoding a first bit cell to determine which of said first and second data values is encoded therein;

means, responsive to said first bit cell decoding means, for determining the width of said first bit cell;

means, responsive to said determining means, for comparing the width of said first bit cell against a predetermined bit cell width:

means, responsive to said determining means, for incrementing said predetermined bit cell width by a first predetermined amount if the width of said first bit cell exceeds said predetermined bit cell width, and for decrementing said predetermined bit cell width by a second predetermined amount if the width of said first bit cell is less than said predetermined bit cell width, to thereby produce a modified predetermined bit cell width; and means, responsive to said incrementing and decrementing means, for decoding a second bit cell, to determine which of said first and second data values is encoded therein, using said modified predetermined bit cell width.

11. The apparatus of claim 9 wherein said manipulating means comprises:

first means for scanning said digital value to decode a first bit cell having one of said first and second data values therein;

second means, responsive to said first means, for scanning said digital values after said first bit cell, to decode a second bit cell having one of said first and second data values therein; and third means, responsive to said first and second means for indicating that said digital values between said first and second bit cells is a bad area if said first and second bit cells are not contiguous.

12. The apparatus of claim 9 wherein said manipulating means comprises:

means for detecting peaks in said digital values which are outside a predetermined guard band;

means, responsive to said peak detecting means, for decoding said two-frequency data signal based upon the detected peaks in said digital values which are outside said predetermined guard band;

means, responsive to said decoding means, for determining whether said two-frequency data signal was decoded improperly; and means, responsive to said determining means, for decreasing said predetermined guard band, if said two-frequency data signal was decoded improperly, and for providing the decreased predetermined guard band to said peak detecting means.

13. The apparatus of claim 9 wherein said plurality of bit cells have a bit cell width, and wherein said manipulating means comprises:

means for detecting peaks in said digital values;

means, responsive to said peak detecting means, for determining displacements among the detected peaks; and means, responsive to said displacement determining means, for comparing the determined displacements among the detected peaks against said bit cell width, to thereby detect said first and second data values.

14. A system for decoding a data signal encoded on a data signal media, comprising:

means for reading said data signal on said data signal media;

means, responsive to said reading means, for decoding the data signal on said data signal media;

means, responsive to said decoding means, for determining that said data signal is degraded notwithstanding that said decoding means decoded the data signal free of errors; and means, responsive to said determining means, for producing a degraded data signal indication;

wherein said data signal is a financial transaction data signal and wherein said data signal media is a financial transaction media, said financial transaction data signal including an account number and other financial transaction information, said decoding system further comprising:

means for decoding said financial transaction data signal on said financial transaction media to produce said account number and said other financial transaction information;

a host computer, connected to said decoding means, for receiving said account number and said other financial transaction information;

means, responsive to said decoding means, for determining whether said two-frequency data signal was decoded improperly; and means, responsive to said determining means, for decreasing said predtermined guard band, if said two-frequency data signal was decoded improperly, and for providing the decreased predetermined guard band to said peak detecting means.

15. The system of claim 14 wherein said host computer further comprises means for initiating replacement of said financial transaction media upon receipt of said account number from said decoding means, in the absence of said other financial transaction information.

16. The system of claim 14 wherein said financial transaction media comprises a magnetic stripe bearing financial transaction card.

17. The system of claim 14 wherein said decoding means comprises an automatic teller machine.

18. The system of claim 14 wherein said decoding means comprises a point of sale terminal.

19. The system of claim 14 wherein said financial transaction data signal comprises a two-frequency data signal, encoded as a plurality of bit cells, with a first data value being represented by a bit cell having a signal of a first frequency therein, and a second data value being represented by a bit cell having a second frequency which is twice said first frequency therein; and wherein said decoding means comprises:

means for obtaining samples of said two-frequency data signal;

means, connected to said sample obtaining means, for converting obtained samples of said two-frequency data signal into digital values; and means connected to said converting means, for manipulating the digital values, to thereby decode said two-frequency data signal to produce said account number and said other financial transaction information.

20. The system of claim 19 wherein said manipulating means comprises:

means for decoding a first bit cell to determine which of said first and second data values is encoded therein;

means, responsive to said first bit cell decoding means, for determining the width of said first bit cell;

means, responsive to said determining means, for comparing the width of said first bit cell against a predetermined bit cell width;

means, responsive to said determining means, for incrementing said predetermined bit cell width by a first predetermined amount if the width of said first bit cell exceeds said said predetermined bit cell width, and for decrementing said predetermined bit cell width by a second predetermined amount if the width of said first bit cell is less than said predetermined bit cell width, to thereby produce a modified predetermined bit cell width; and means, responsive to said incrementing and decrementing means, for decoding a second bit cell, to determine which of said first and second data values is encoded therein, using said modified predetermined bit cell width.

21. The system of claim 19 wherein said manipulating means comprises:

first means for scanning said digital value to decode a first bit cell having one of said first and second data values therein;

second means, responsive to said first means, for scanning said digital values after said first bit cell, to decode a second bit cell having one of said first and second data values therein; and third means, responsive to said first and second means for indicating that said digital values between said first and second bit cells is a bad area if said first and second bit cells are not contiguous.

22. The system of claim 19 wherein said manipulating means comprises:

means for detecting peaks in said digital values which are outside a predetermined guard band;

means, responsive to said peak detecting means, for decoding said two-frequency data signal based upon the detected peaks in said digital values which are outside said predetermined guard band;

means, responsive to said decoding means, for determining whether said two-frequency data signal was decoded improperly; and means, responsive to said determining means, for decreasing said predetermined guard band, if said two-frequency data signal was decoded improperly, and for providing the decreased predetermined guard band to said peak detecting means.

23. The system of claim 19 wherein said plurality of bit cells have a bit cell width, and wherein said manipulating means comprises:

means for detecting peaks in said digital values;

means, responsive to said peak detecting means, for determining displacements among the detected peaks; and means, responsive to said displacement determining means, for comparing the determined displacements among the detected peaks against said bit cell width, to thereby detect said first and second data values.

24. Apparatus for decoding a data signal having a plurality of bytes of digital bit data, at least one of said bytes comprising a longitudinal redundancy check byte, said apparatus comprising:

means for decoding each of said plurality of bytes of digital bit data and for identifying each decoded byte as being one of properly decoded and having a possible error;

means for performing a longitudinal redundancy check upon said plurality of bytes, using the associated longitudinal redundancy check byte; and means, responsive to said longitudinal redundancy check being successfully performed, for correcting said possible error by identifying each of said plurality of bytes as being property decoded.

25. The apparatus of claim 24 further comprising means, responsive to said longitudinal redundancy check being unsuccessfully performed, for identifying each possible error byte as being unrecognizable.

26. The apparatus of claim 24 wherein said data signal comprises a two-frequency data signal, encoded as a plurality of bit cells, with a first data value being represented by a bit cell having a signal of a first frequency therein, and a second data value being represented by a bit cell having a second frequency which is twice said first frequency therein; and wherein said decoding means comprises:

means for obtaining samples of said two-frequency data signal;

means, connected to said sample obtaining means, for converting obtained samples of said two-frequency data signal into digital values; and means connected to said converting means, for manipulating the digital values, to thereby decode said two-frequency data signal.

27. The apparatus of claim 26 wherein said manipulating means comprises:

means for decoding a first bit cell to determine which of said first and second data values is encoded therein;

means, responsive to said first bit cell decoding means, for determining the width of said first bit cell;

means, responsive to said determining means, for comparing the width of said first bit cell against a predetermined bit cell width;

means, responsive to said determining means, for incrementing said predetermined bit cell width by a first predetermined amount if the width of said first bit cell exceeds said predetermined bit cell width, and for decrementing said predetermined bit cell width by a second predetermined amount if the width of said first bit cell is less than said predetermined bit cell width, to thereby produce a modified predetermined bit cell width; and means, responsive to said incrementing and decrementing means, for decoding a second bit cell, to determine which of said first and second data values is encoded therein, using said modified predetermined bit cell width.

28. The apparatus of claim 26 wherein said manipulating means comprises:
   first means for scanning said digital value to decode a first bit cell having one of said first and second data values therein;
   second means, responsive to said first means, for scanning said digital values after said first bit cell, to decode a second bit cell having one of said first and second data values therein; and
   third means, responsive to said first and second means for indicating that said digital values between said first and second bit cells is a bad area if said first and second bit cells are not contiguous.

29. The apparatus of claim 26 wherein said manipulating means comprises:
   means for detecting peaks in said digital values which are outside a predetermined guard band;
   means, responsive to said peak detecting means, for decoding said two-frequency data signal based upon the detected peaks in said digital values which are outside said predetermined guard band;
   means, responsive to said decoding means, for determining whether said two-frequency data signal was decoded improperly; and
   means, responsive to said determining means, for decreasing said predetermined guard band, if said two-frequency data signal was decoded improperly, and for providing the decreased predetermined guard band to said peak detecting means.

30. The apparatus of claim 26 wherein said plurality of bit cells have a bit cell width, and wherein said manipulating means comprises:
   means for detecting peaks in said digital values;
   means, responsive to said peak detecting means, for determining displacements among the detected peaks; and
   means, responsive to said displacement determining means, for comparing the determined displacements among the detected peaks against said bit cell width, to thereby detect said first and second data values.

* * * * *